US012682251B2

(12) United States Patent
Tsuchida

(10) Patent No.: US 12,682,251 B2
(45) Date of Patent: Jul. 14, 2026

(54) FEDERATED LEARNING SYSTEM, FEDERATED LEARNING APPARATUS, FEDERATED LEARNING METHOD, AND FEDERATED LEARNING PROGRAM

(71) Applicant: NEC Corporation, Tokyo (JP)

(72) Inventor: Hikaru Tsuchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 547 days.

(21) Appl. No.: 18/275,148

(22) PCT Filed: Feb. 5, 2021

(86) PCT No.: PCT/JP2021/004239
§ 371 (c)(1),
(2) Date: Jul. 31, 2023

(87) PCT Pub. No.: WO2022/168257
PCT Pub. Date: Aug. 11, 2022

(65) Prior Publication Data
US 2024/0070469 A1 Feb. 29, 2024

(51) Int. Cl.
*G06N 3/098* (2023.01)
*G06F 21/62* (2013.01)
*G06N 20/00* (2019.01)

(52) U.S. Cl.
CPC ......... *G06N 3/098* (2023.01); *G06F 21/6218* (2013.01); *G06F 21/6245* (2013.01); *G06N 20/00* (2019.01)

(58) Field of Classification Search
CPC .......... G06N 3/08; G06N 3/096; G06N 3/098; G06N 3/0985; G06N 20/00; G06N 20/10;
(Continued)

(56) References Cited

U.S. PATENT DOCUMENTS

| 2018/0018590 A1 | 1/2018 | Szeto et al. |
| 2018/0261133 A1 | 9/2018 | Hamada et al. |
(Continued)

FOREIGN PATENT DOCUMENTS

| CN | 111241567 A | 6/2020 |
| CN | 111860829 A | 10/2020 |
(Continued)

OTHER PUBLICATIONS

International Search Report for PCT Application No. PCT/JP2021/004239, mailed on Apr. 13, 2021.
(Continued)

*Primary Examiner* — Shane D Woolwine
(74) *Attorney, Agent, or Firm* — Sughrue Mion, PLLC

(57) ABSTRACT

A federated learning apparatus in a federated learning system includes: a model storage part that replicates and stores a shared model as a local model; a local training part that trains the local model by using data held by the federated learning apparatus; a secret sharing part that decomposes a local update parameter indicating a training result of the local model into shares based on an additive secret sharing scheme and distributes the shares to other federated learning apparatuses; an aggregation and secure computation part that performs a secure computation for shares of a global update parameter by performing addition of the shares of the local update parameters and multiplication of the shares by cleartext constants; and a global training part that reconstructs the shares of the global update parameter and updates the shared model by the global update parameter.

20 Claims, 22 Drawing Sheets

(58) Field of Classification Search
CPC .. G06N 20/20; G06F 21/6218; G06F 21/6245
See application file for complete search history.

(56) References Cited

U.S. PATENT DOCUMENTS

| | | |
|---|---|---|
| 2018/0316502 A1 | 11/2018 | Nadeau et al. |
| 2020/0358599 A1 | 11/2020 | Baracaldo Angel et al. |
| 2021/0234668 A1* | 7/2021 | Manamohan ......... H04L 9/3239 |
| 2021/0351916 A1 | 11/2021 | Tsuchida et al. |
| 2022/0067584 A1 | 3/2022 | Yonetani |
| 2022/0129580 A1* | 4/2022 | Lin ........................ G06N 3/098 |
| 2023/0281508 A1* | 9/2023 | Du ........................ G06N 3/084 |
| | | 706/12 |

FOREIGN PATENT DOCUMENTS

| | | |
|---|---|---|
| JP | 2016-173532 A | 9/2016 |
| JP | 2017-129913 A | 7/2017 |
| JP | 2017-207839 A | 11/2017 |
| JP | 2019-526851 A | 9/2019 |
| JP | 2020-115312 A | 7/2020 |
| WO | 2017/065123 A1 | 4/2017 |
| WO | 2020/075273 A1 | 4/2020 |

OTHER PUBLICATIONS

Bonawitz, Keith, et al. "Practical secure aggregation for privacy-preserving machine learning", Proceedings of the 2017 ACM SIGSAC Conference on Computer and Communications Security. 2017.
JP Office Action for JP Application No. 2022-579256, mailed on Oct. 22, 2024 with English Translation.

* cited by examiner

START

S11 — MODEL REPLICATION

S12 — LOCAL TRAINING

S13 — SECRET SHARING OF UPDATE PARAMETER

S14 — AGGREGATION OF UPDATE PARAMETERS

S15 — GLOBAL TRAINING

END

200_i

201_i
MODEL STORAGE PART

202_i
LOCAL TRAINING PART

203_i
SECRET SHARING PART

204_i
AGGREGATION AND SECURE COMPUTATION PART

205_i
GLOBAL TRAINING PART

206_i
FIRST STOP-TYPE FRAUD DETECTION PART

207_i
SECOND STOP-TYPE FRAUD DETECTION PART

Figure 8:
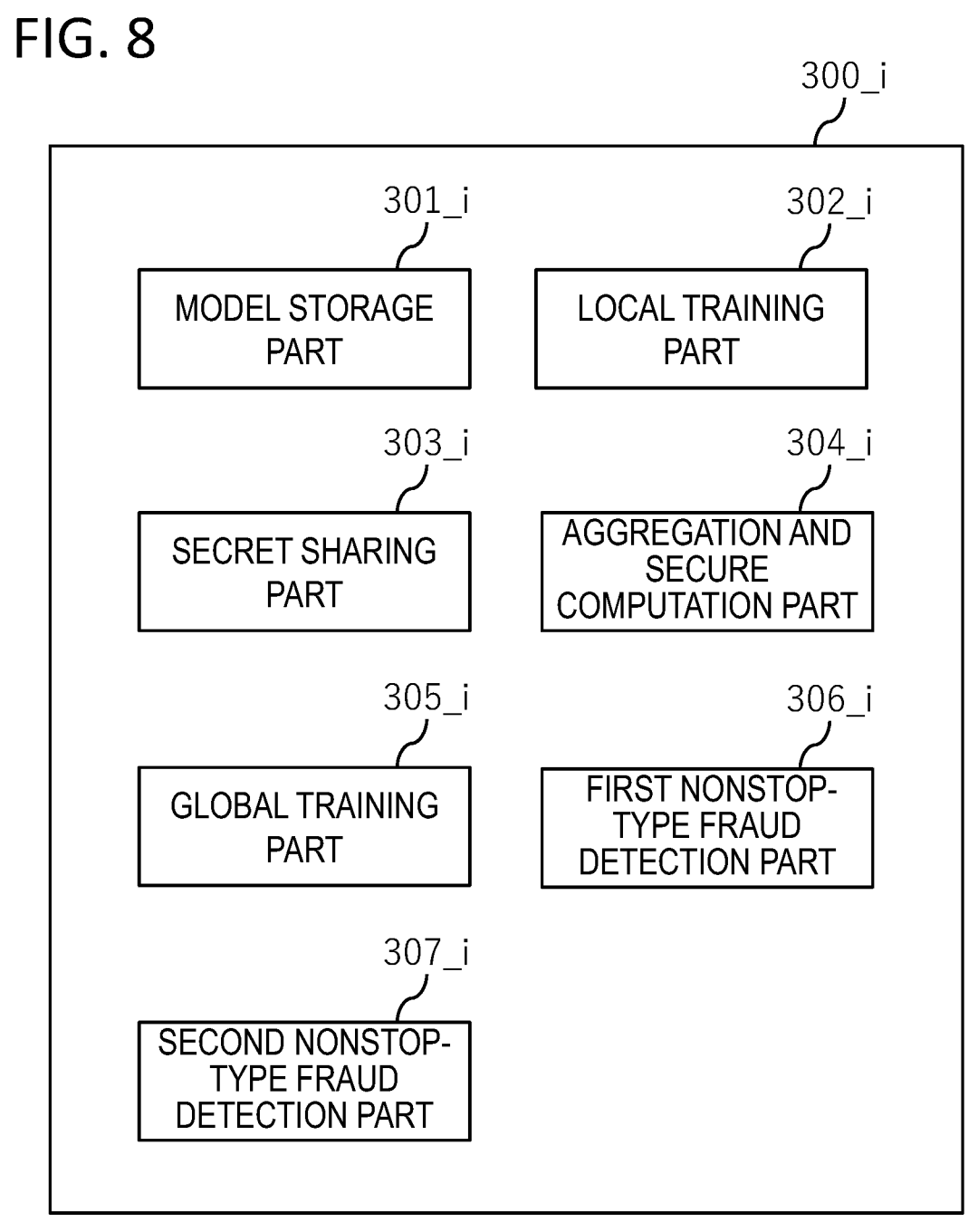

MODEL STORAGE PART

302_i

LOCAL TRAINING PART

303_i

SECRET SHARING PART

304_i

AGGREGATION AND SECURE COMPUTATION PART

305_i

GLOBAL TRAINING PART

306_i

FIRST NONSTOP-TYPE FRAUD DETECTION PART

307_i

SECOND NONSTOP-TYPE FRAUD DETECTION PART

FEDERATED LEARNING SYSTEM, FEDERATED LEARNING APPARATUS, FEDERATED LEARNING METHOD, AND FEDERATED LEARNING PROGRAM

This application is a National Stage Entry of PCT/JP2021/004239 filed on Feb. 5, 2021, the contents of all of which are incorporated herein by reference, in their entirety.

FIELD

The present invention relates to a federated learning system, a federated learning apparatus, a federated learning method, and a federated learning program.

BACKGROUND

Federated learning (FL) is a technique in the field of machine learning. This federated learning is a technique for providing data held by an individual user (client) for learning of a shared model, without disclosing the data to the other users (clients). With this technique, it is possible to increase the amount and diversity of the data used for learning of a model, without disclosing the data held by an individual user (client) to the other users (clients). Therefore, the federated learning is a technique that contributes to improvement in model training accuracy.

A basic approach of the federated learning constituted by a central server and a plurality of clients is as follows. The central server holds a model on which learning is performed, and transmits this model to the individual clients. Each client trains the received model by using data held thereby, and transmits an update parameter obtained as a result of the training to the central server. The central server computes a weighted average of the update parameters of the model, which are received from the individual clients, by using the data amounts of the individual clients, and updates the model. By transmitting and receiving the update parameters and performing computation processing as described above, it is possible to train the model without disclosing the data held by the individual user (client) to the other users (clients).

As described above, in the federated learning, although the data held by the individual user is not disclosed to the other users (clients), the update parameters need to be transmitted and received. In addition, there is known an attack that leaks information about the training data from the update parameters of the individual clients. Thus, there is a demand for concealing the update parameters, and a technique for concealing the update parameters by using a multi-party secure computation based on a secret sharing scheme is also known (see NPL 1, for example).

NPL 1: Bonawitz, Keith, et al. "Practical secure aggregation for privacy-preserving machine learning." Proceedings of the 2017 ACM SIGSAC Conference on Computer and Communications Security. 2017.

SUMMARY

The disclosure of the above citation list is incorporated herein in its entirety by reference thereto. The following analysis has been made by the present inventor.

Various kinds of attacks against a multi-party secure computation based on a secret sharing scheme (which will be simply referred to as "secure computation") have been known, and different methods have been used to ensure the security of the secure computation against these attacks. For example, there are cases in which some of the participants in the secure computation collude with each other to acquire secret data fraudulently. There are also cases in which information transmitted or received by a participant is falsified. Ensuring the security against these attacks involves a kind of a trade-off relationship. Thus, it is preferable to suitably select the security measures based on the actual situation in which the secure computation is used. In addition, when the federated learning technique and secure computation are combined with each other, it is preferable to flexibly select the role of the central server.

In view of the above problem, it is an object of the present invention to provide a federated learning system, a federated learning apparatus, a federated learning method, and a federated learning program that contribute to combining a secure computation with a federated learning technique.

According to a first aspect of the present invention, there is provided a federated learning system, which includes at least two federated learning apparatuses connected to each other via a network so as to train a shared model, an individual one of the federated learning apparatuses including: a model storage part that replicates and stores the shared model as a local model; a local training part that trains the local model by using data held by the individual one of the federated learning apparatuses; a secret sharing part that decomposes a local update parameter indicating a training result of the local model into shares based on an additive secret sharing scheme and distributes the shares to the other federated learning apparatuses; an aggregation and secure computation part that performs a secure computation for shares of a global update parameter by performing addition of the shares of the local update parameters and multiplication of the shares by cleartext constants; and a global training part that reconstructs the shares of the global update parameter and updates the shared model by the global update parameter.

According to a second aspect of the present invention, there is provided a federated learning system, including federated learning server apparatuses and federated learning client apparatuses connected to each other via a network so as to train a shared model; wherein an individual one of the federated learning client apparatuses includes: a model storage part that replicates and stores the shared model as a local model; a local training part that trains the local model by using data held by the individual one of the federated learning client apparatuses; a secret sharing part that decomposes a local update parameter indicating a training result of the local model into shares based on an additive secret sharing scheme and transmits the shares to the federated learning server apparatuses; and a global training part that reconstructs shares of a global update parameter received from the federated learning server apparatuses and updates the shared model by the global update parameter; and wherein the individual one of the federated learning server apparatuses includes an aggregation and secure computation part that performs a secure computation for the shares of the global update parameter by performing addition of the shares of the local update parameters and multiplication of the shares by cleartext constants and that transmits the shares of the global update parameter to the federated learning client apparatuses.

According to a third aspect of the present invention, there is provided a federated learning apparatus, which is one of at least two federated learning apparatuses connected to each other via a network so as to train a shared model, the federated learning apparatus comprising: a model storage part that replicates and stores the shared model as a local model; a local training part that trains the local model by using data held by the federated learning apparatus; a secret sharing part that decomposes a local update parameter indicating a training result of the local model into shares based on an additive secret sharing scheme and distributes the shares to the other federated learning apparatuses; an aggregation and secure computation part that performs a secure computation for shares of a global update parameter by performing addition of the shares of the local update parameters and multiplication of the shares by cleartext constants; and a global training part that reconstructs the shares of the global update parameter and updates the shared model by the global update parameter.

According to a fourth aspect of the present invention, there is provided a federated learning apparatus, which is one of at least two federated learning apparatuses connected to each other via a network so as to train a shared model, the federated learning apparatus comprising: a model storage part that replicates and stores the shared model as a local model; a local training part that trains the local model by using data held by the federated learning apparatus; a secret sharing part that decomposes a local update parameter indicating a training result of the local model into shares based on an additive secret sharing scheme and distributes the shares to second federated learning apparatuses; and a global training part that reconstructs shares of a global update parameter that the second federated learning apparatuses obtains by performing a secure computation by performing addition of the shares of the local update parameters and multiplication of the shares by cleartext constants, and updates the shared model by the global update parameter.

According to a fifth aspect of the present invention, there is provided a federated learning apparatus, which is one of at least two federated learning apparatuses connected to each other via a network, the federated learning apparatus aggregating local update parameters indicating training results of a local model that are obtained by the other federated learning apparatuses by using data held by the other federated learning apparatuses, the federated learning apparatus comprising: an aggregation and secure computation part that performs a secure computation for shares of a global update parameter by performing addition of shares obtained by decomposing the local update parameters based on an additive secret sharing scheme and multiplication of the shares by cleartext constants; wherein the federated learning apparatus transmits the shares of the global update parameter to the other federated learning apparatuses.

According to a sixth aspect of the present invention, there is provided a federated learning method, which is performed coordinately by at least two federated learning apparatuses connected to each other via a network so as to train a shared model, the federated learning method comprising: causing an individual one of the federated learning apparatuses to replicate and store the shared model as a local model; causing the individual one of the federated learning apparatuses to train the local model by using data held thereby; causing the individual one of the federated learning apparatuses to decompose a local update parameter indicating a training result of the local model into shares based on an additive secret sharing scheme and to distribute shares to the other federated learning apparatuses; causing the individual one of the federated learning apparatuses to perform a secure computation for shares of a global update parameter by performing addition of the shares of the local update parameters and multiplication of the shares by cleartext constants; and causing the individual one of the federated learning apparatuses to reconstruct the shares of the global update parameter and to update the shared model.

According to a seventh aspect of the present invention, there is provided a federated learning program, causing at least two federated learning apparatuses connected to each other via a network to coordinately train a shared model, the federated learning program comprising: causing an individual one of the federated learning apparatuses to replicate and store the shared model as a local model; causing the individual one of the federated learning apparatuses to train the local model by using data held thereby; causing the individual one of the federated learning apparatuses to decompose a local update parameter indicating a training result of the local model into shares based on an additive secret sharing scheme and to distribute shares to the other federated learning apparatuses; causing the individual one of the federated learning apparatuses to perform a secure computation for shares of a global update parameter by performing addition of the shares of the local update parameters and multiplication of the shares by cleartext constants; and causing the individual one of the federated learning apparatuses to reconstruct the shares of the global update parameter and to update the shared model. The program can be recorded in a computer-readable storage medium. The storage medium may be a non-transitory storage medium such as a semiconductor memory, a hard disk, a magnetic recording medium, or an optical recording medium. The present invention can be embodied as a computer program product.

According to the individual aspects of the present invention, there are provided a federated learning system, a federated learning apparatus, a federated learning method, and a federated learning program that contribute to combining a secure computation with a federated learning technique.

BRIEF DESCRIPTION OF DRAWINGS

FIG. 8 is a block diagram illustrating a functional configuration example of a federated learning apparatus according to the third example embodiment.

EXAMPLE EMBODIMENTS

Figure 1:
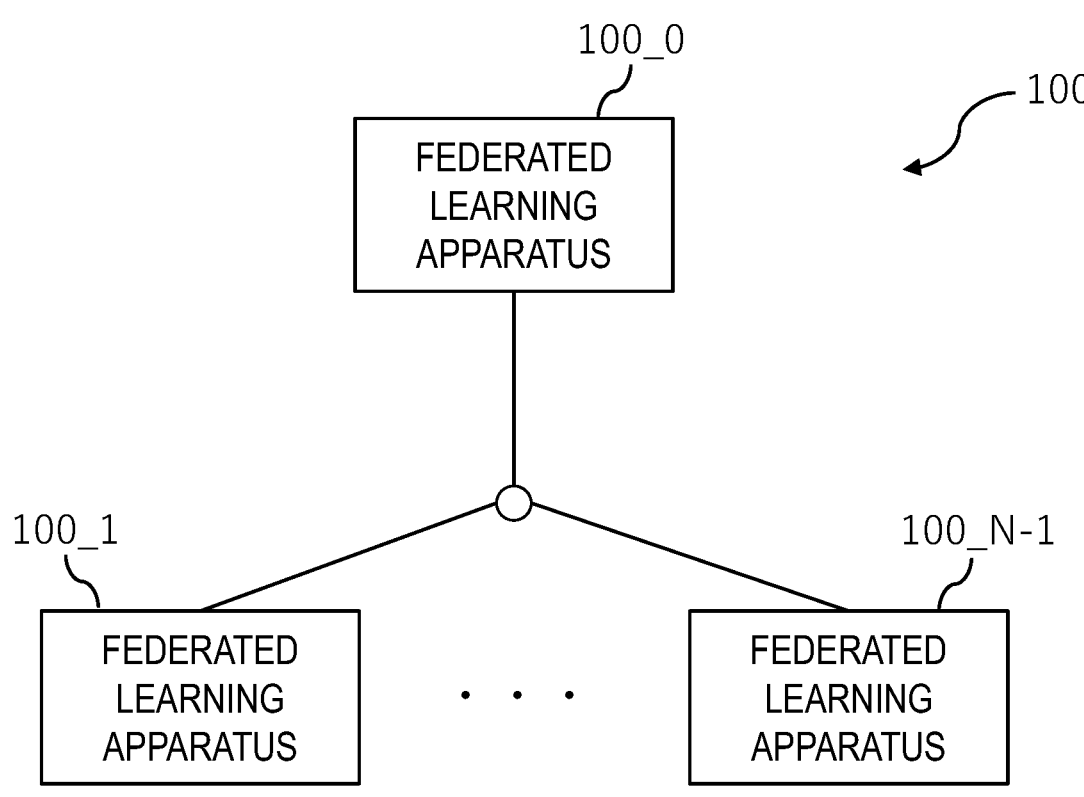
FIG. 1 is a block diagram illustrating a functional configuration example of a federated learning system according to a first example embodiment.

Hereinafter, example embodiments of the present invention will be described with reference to the accompanying drawings. However, the present invention is not limited to the following example embodiments. In addition, in the drawings, the same or equivalent elements are denoted by the same reference characters, as necessary. In addition, the drawings are schematic drawings, and therefore, it should be noted that the sizes, ratios, etc. of the individual elements may differ from their actual sizes, ratios, etc. An element in a drawing may have a portion whose size or ratio differs from that of the portion of the element in a different drawing.

First Example Embodiment

Hereinafter, a federated learning system and federated learning apparatuses according to a first example embodiment will be described with reference to FIGS. 1 and 2.

FIG. 1 is a block diagram illustrating a functional configuration example of the federated learning system according to the first example embodiment. As illustrated in FIG. 1, a federated learning system 100 according to the first example embodiment includes first to Nth federated learning apparatuses 100_*i* (i=0, 1, . . . , N–1). These first to Nth federated learning apparatuses 100_*i* (i=0, 1, . . . , N–1) are connected to each other via a network such that these apparatuses can communicate with each other. N is a natural number of 2 or more.

The first to Nth federated learning apparatuses 100_*i* (i=0, 1, . . . , N–1) are each operated by an independent organization (user). In addition, the first to Nth federated learning apparatuses 100_*i* (i=0, 1, . . . , N–1) store data that their respective organizations do not wish to disclose to the outside. Although the organizations do not wish to disclose their own data to the outside, these organizations wish to mutually utilize their data and to perform machine learning on a shared model.

In federated learning, the first to Nth federated learning apparatuses 100_*i* (i=0, 1, . . . , N–1) replicate a shared model as a local model and train this local model by data held thereby. Next, update parameters indicating training results of the local model are aggregated. However, secret data could be leaked from these update parameters. Thus, in the federated learning system 100 according to the first example embodiment, each of the first to Nth federated learning apparatuses 100_*i* (i=0, 1, . . . , N–1) has the following configuration.

Figure 2:
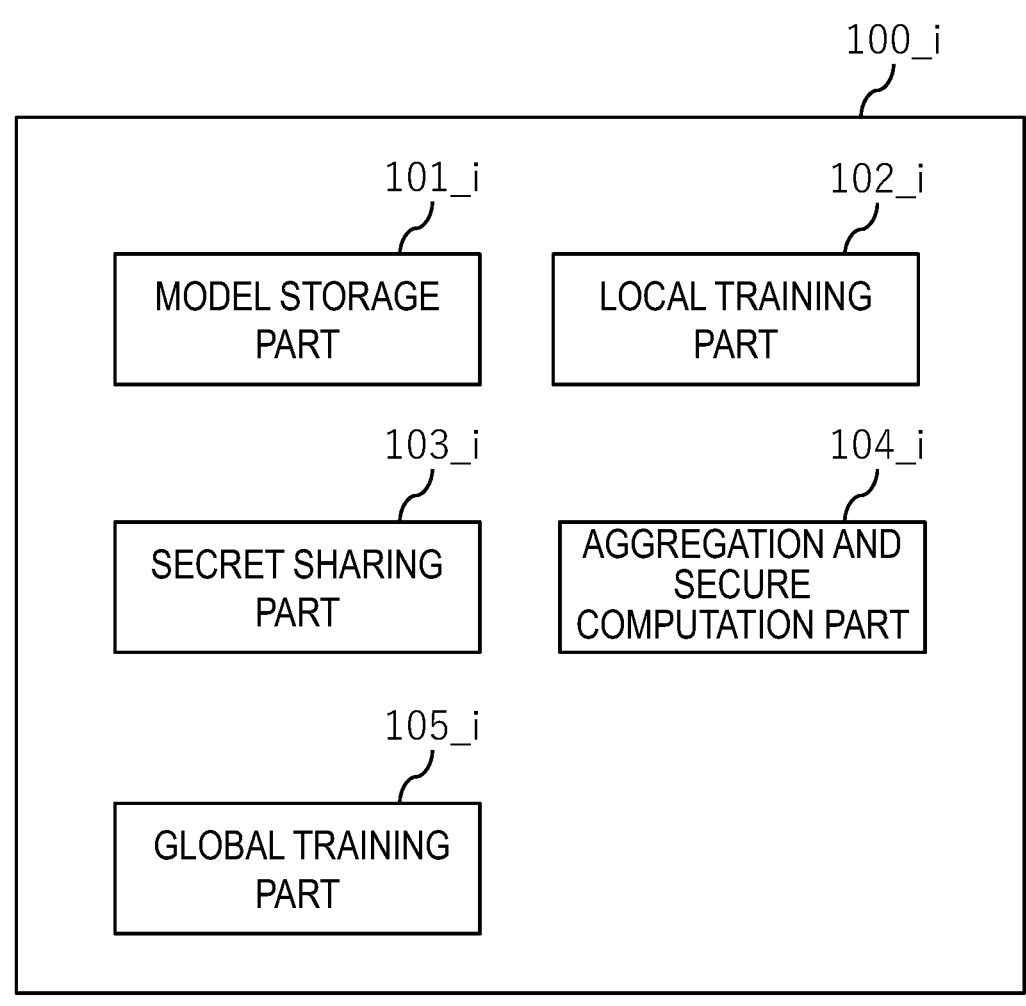
FIG. 2 is a block diagram illustrating a functional configuration example of a federated learning apparatus according to the first example embodiment.

FIG. 2 is a block diagram illustrating a functional configuration example of a federated learning apparatus according to the first example embodiment. As illustrated in FIG. 2, each of the first to Nth federated learning apparatuses 100_*i* (i=0, 1, . . . , N–1) includes a model storage part 101_*i*, a local training part 102_*i*, a secret sharing part 103_*i*, an aggregation and secure computation part 104_*i*, and a global training part 105_*i*.

The model storage part 101_*i* is a storage device for replicating and storing a shared model, which is the target of the federated learning, as a local model. In addition, the local training part 102_*i* is a processing part for training the local model by using data held by the individual one of the first to Nth federated learning apparatuses 100_*i* (i=0, 1, . . . , N–1).

The secret sharing part 103_*i* is a processing part for decomposing a local update parameter indicating the training result of the local model into shares based on an additive secret sharing scheme and for transmitting shares to the other federated learning apparatuses 100_*i*.

The additive secret sharing scheme is a secret sharing scheme for decomposing a value x into a sum on a residue class ring $Z_L$ of modulo L, as described below.

$$x = x_0 + \ldots + x_{N-1} \bmod L \qquad \text{[Equation 1]}$$

In this N-out-of-N additive secret sharing, the value x decomposed into a sum on the residue class ring $Z_L$ of modulo L as described above is dispersedly held by the first to Nth federated learning apparatuses 100_*i* (i=0, 1, . . . , N–1) as follows. The dispersedly held data may be referred to as the shares of the value x.

$$[x]_{L,\ (N,N)A} = ([x]_{L,(N,N)A,0}, \ldots, [x]_{L,(N,N)A,N-1})$$

$$[x]_{L,(N,N)A,i} = x_i \qquad \text{[Equation 2]}$$

The replication of the shares constructed as described above is 1. That is, the first to Nth federated learning apparatuses 100_*i* (i=0, 1, . . . , N–1) each hold $x_i$. This means that, even if a number t of participants of all the N participants (t<N) collude with each other, the original value x cannot be reconstructed. Thus, this scheme achieves the highest security against collusion attacks.

The secret sharing part 103_*i* decomposes the local update parameter indicating the training result of the local model into a sum on the residue class ring $Z_L$ of modulo L based on the above scheme and transmits values obtained by the decomposition to the other federated learning apparatuses $100\_i$ in accordance with the above scheme.

The aggregation and secure computation part $104\_i$ is a processing part for performing a secure computation for shares of a global update parameter by performing addition of the shares of the local update parameters and multiplication of the shares by cleartext constants. Each of the first to Nth federated learning apparatuses $100\_i$ (i=0, 1, . . . , N−1) uses its own data to obtain a different local update parameter $\Delta_i$ (i=0, 1, . . . , N−1) indicating a training result. In addition, each of the first to Nth federated learning apparatuses $100\_i$ (i=0, 1, . . . , N−1) holds a different amount of data.

Thus, in order to aggregate the shares of the local update parameters and obtain a share of a global update parameter, each of the first to Nth federated learning apparatuses $100\_i$ (i=0, 1, . . . , N−1) needs to compute a weighted average of the local update parameters $\Delta_i$ (i=0, 1, . . . , N−1) weighted by data volumes $V_i$ of the first to Nth federated learning apparatuses $100\_i$ (i=0, 1, . . . , N−1).

The aggregation and secure computation part $104\_i$ computes a weighted average of the local update parameters $\Delta_i$ (i=0, 1, . . . , N−1) weighted by the data volumes $V_i$ (i=0, 1, . . . , N−1) by performing addition of the shares of the local update parameters and multiplication of the shares by cleartext constants. The data volumes $V_i$ (i=0, 1, . . . , N−1), which have been acquired and stored in advance, may be used. Alternatively, the data volumes $V_i$ (i=0, 1, . . . , N−1) may be transmitted when the shares of the local update parameters are transmitted.

In normal secure computations, accumulation requires a lot of communication costs. However, the addition of the shares and the multiplication of the shares by cleartext constants can be computed without communications. Concretely, the addition and the multiplication can be computed as follows.

The addition of the shares $[x]+[y]=[z]$ can be computed by $[z]_i=(z_i, z_{i+1}, . . . , z_{i+N-1})$ as $z_i=x_i+y_i$ mod n. The multiplication of the shares by cleartext constants $[x]\cdot c= [x\cdot c]$ can be computed by $[x\cdot c]_i=(x'_i, x'_{i+1}, . . . , x'_{i+N-1})$ as $x'_i=c\cdot x_i$ mod n.

The global training part $105\_i$ is a processing part for reconstructing the shares of the global update parameter and updating the shared model. The global training part $105\_i$ receives the shares of the global update parameter stored in the first to Nth federated learning apparatuses $100\_i$ (i=0, 1, . . . , N−1) in a secret sharing manner, and reconstructs the global update parameter. Next, by applying the reconstructed global update parameter to the shared model, which is the target of the federated learning, the global training part $105\_i$ trains the shared model.

As described above, in the federated learning system according to the first example embodiment, since each of the first to Nth federated learning apparatuses $100\_i$ (i=0, 1, . . . , N−1) has the above configuration, it is possible to perform the federated learning while concealing the local update parameters. In the federated learning system according to the first example embodiment, since the processing can be performed only by performing a secure computation with addition and multiplication by cleartext constants (without multiplications), the communication cost is low. In addition, since the federated learning system according to the first example embodiment uses the N-out-of-N additive secret sharing of which the replication is 1, the federated learning system has a high security against collusion attacks.

Method

Figure 3:
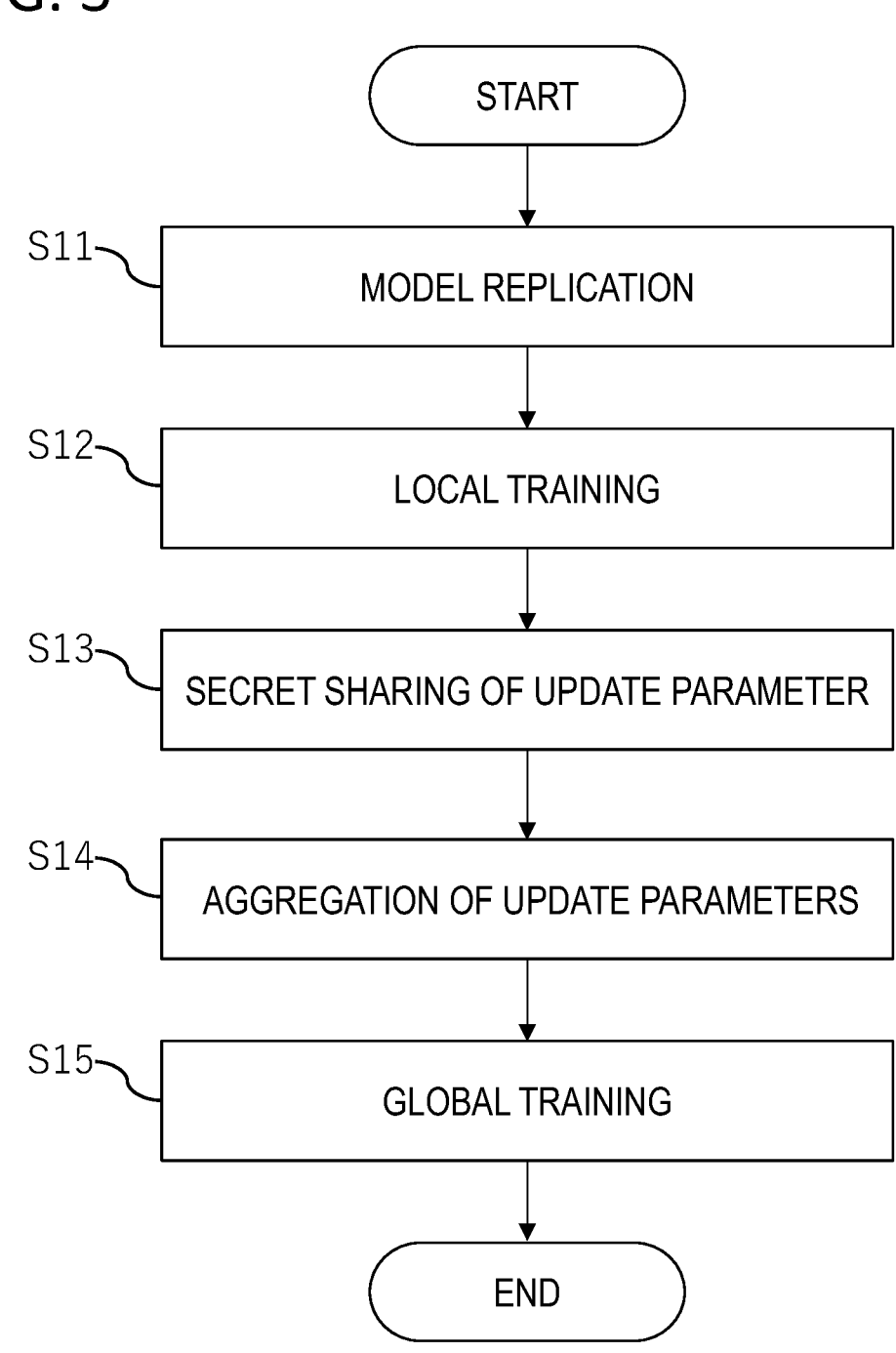
FIG. 3 is a flowchart illustrating an outline of a procedure of a federated learning method according to the first example embodiment.

Next, a federated learning method according to the first example embodiment will be described. FIG. 3 is a flowchart illustrating an outline of a procedure of the federated learning method according to the first example embodiment.

As illustrated in FIG. 3, the federated learning method according to the first example embodiment includes a model replication step (S11), a local training step (S12), an update parameter secret sharing step (S13), an update parameter aggregation step (S14), and a global training step (S15).

In the model replication step (S11), each of the first to Nth federated learning apparatuses $100\_i$ (i=0, 1, . . . , N−1) replicates and stores a shared model, which is the target of the federated learning, as a local model. Next, in the local training step (S12), each of the first to Nth federated learning apparatuses $100\_i$ (i=0, 1, . . . , N−1) trains the local model by using the data held thereby.

In the update parameter secret sharing step (S13), each of the first to Nth federated learning apparatuses $100\_i$ (i=0, 1, . . . , N−1) decomposes a local update parameter obtained in the local training step (S12) into shares based on an additive secret sharing scheme and transmits shares to the other federated learning apparatuses $100\_i$. In this step, the above N-out-of-N additive secret sharing is used as the additive secret sharing scheme. That is, the replication of the additive secret sharing scheme according to the first example embodiment is 1, and a different share is given to each of the first to Nth federated learning apparatuses $100\_i$ (i=0, 1, . . . , N−1). That is, this additive secret sharing achieves the highest security against collusion attacks in a sense that the original value x cannot be reconstructed even if, of all the N participants, t participants collude with each other (t<N).

In the update parameter aggregation step (S14), each of the first to Nth federated learning apparatuses $100\_i$ (i=0, 1, . . . , N−1) performs a secure computation for the shares of a global update parameter by performing addition of the received shares of the local update parameters and multiplication of the shares by cleartext constants. Concretely, each of the first to Nth federated learning apparatuses $100\_i$ (i=0, 1, . . . , N−1) computes a weighted average of the local update parameters $\Delta_i$ (i=0, 1, . . . , N−1) weighted by their respective data volumes $V_i$ (i=0, 1, . . . , N−1).

In the global training step (S15), each of the first to Nth federated learning apparatuses $100\_i$ (i=0, 1, . . . , N−1) reconstructs the shares of the global update parameter and updates the shared model by the global update parameter. Concretely, each of the first to Nth federated learning apparatuses $100\_i$ (i=0, 1, . . . , N−1) receives the shares of the global update parameter stored in a secret sharing manner from the other federated learning apparatuses $100\_i$ and reconstructs the global update parameter. Next, each of the first to Nth federated learning apparatuses $100\_i$ (i=0, 1, . . . , N−1) trains the shared model by applying the reconstructed global update parameter to the shared model, which is the target of the federated learning.

As described above, in the federated learning method according to the first example embodiment, since each of the first to Nth federated learning apparatuses $100\_i$ (i=0, 1, . . . , N−1) has the above configuration, it is possible to perform the federated learning while concealing the local update parameters. In the federated learning method according to the first example embodiment, since the processing can be performed only by performing a secure computation with addition and multiplication by cleartext constants (without multiplications), the communication cost is low. In addition, since the federated learning system according to the first example embodiment uses the N-out-of-N additive secret sharing of which the replication is 1, the federated learning system has a high security against collusion attacks.

Second Example Embodiment

Hereinafter, a federated learning system and federated learning apparatuses according to a second example embodiment will be described with reference to FIGS. 4 and 5.

Figure 4:
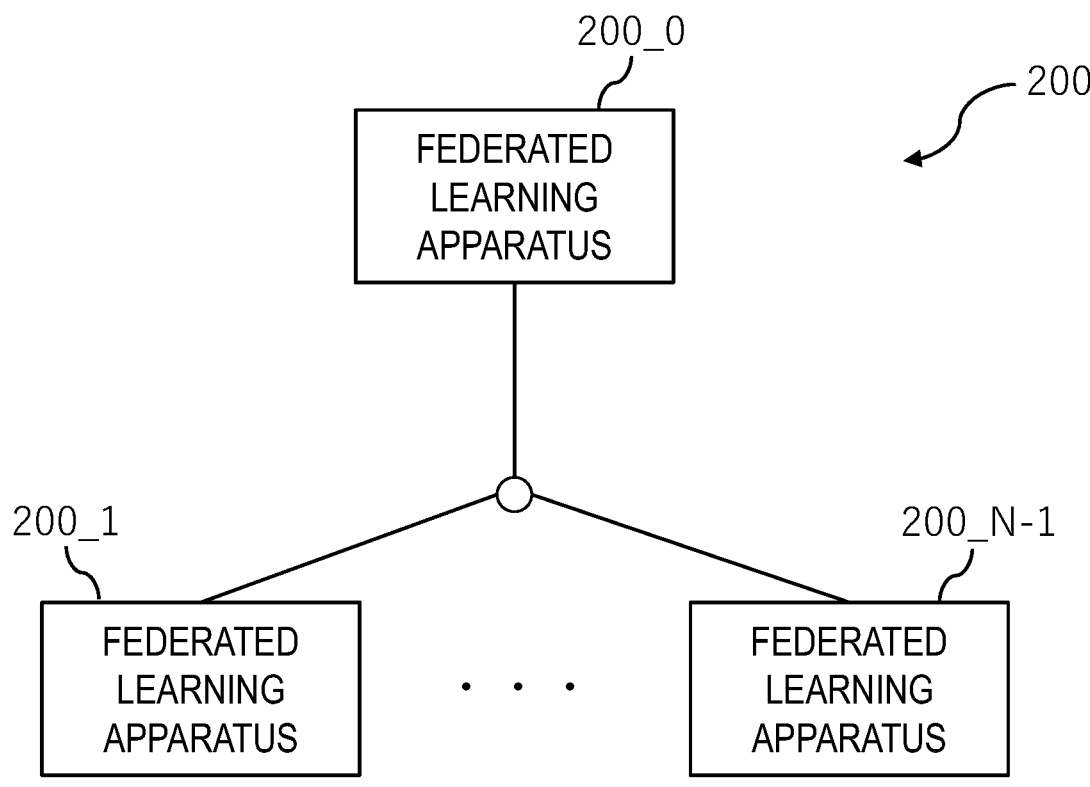
FIG. 4 is a block diagram illustrating a functional configuration example of a federated learning system according to a second example embodiment.

FIG. 4 is a block diagram illustrating a functional configuration example of the federated learning system according to the second example embodiment. As illustrated in FIG. 4, a federated learning system 200 according to the second example embodiment includes first to Nth federated learning apparatuses 200_$i$ ($i$=0, 1, . . . , N−1). These first to Nth federated learning apparatuses 200_$i$ ($i$=0, 1, . . . , N−1) are connected to each other via a network such that these apparatuses can communicate with each other. N is a natural number of 3 or more.

As in the other example embodiments, the first to Nth federated learning apparatuses 200_$i$ ($i$=0, 1, . . . , N−1) are each operated by an independent organization (user). Although the first to Nth federated learning apparatuses 200_$i$ ($i$=0, 1, . . . , N−1) do not wish to disclose their own data to the outside, these federated learning apparatuses 200_$i$ wish to mutually utilize their data and to perform machine learning on a shared model.

Figure 5:
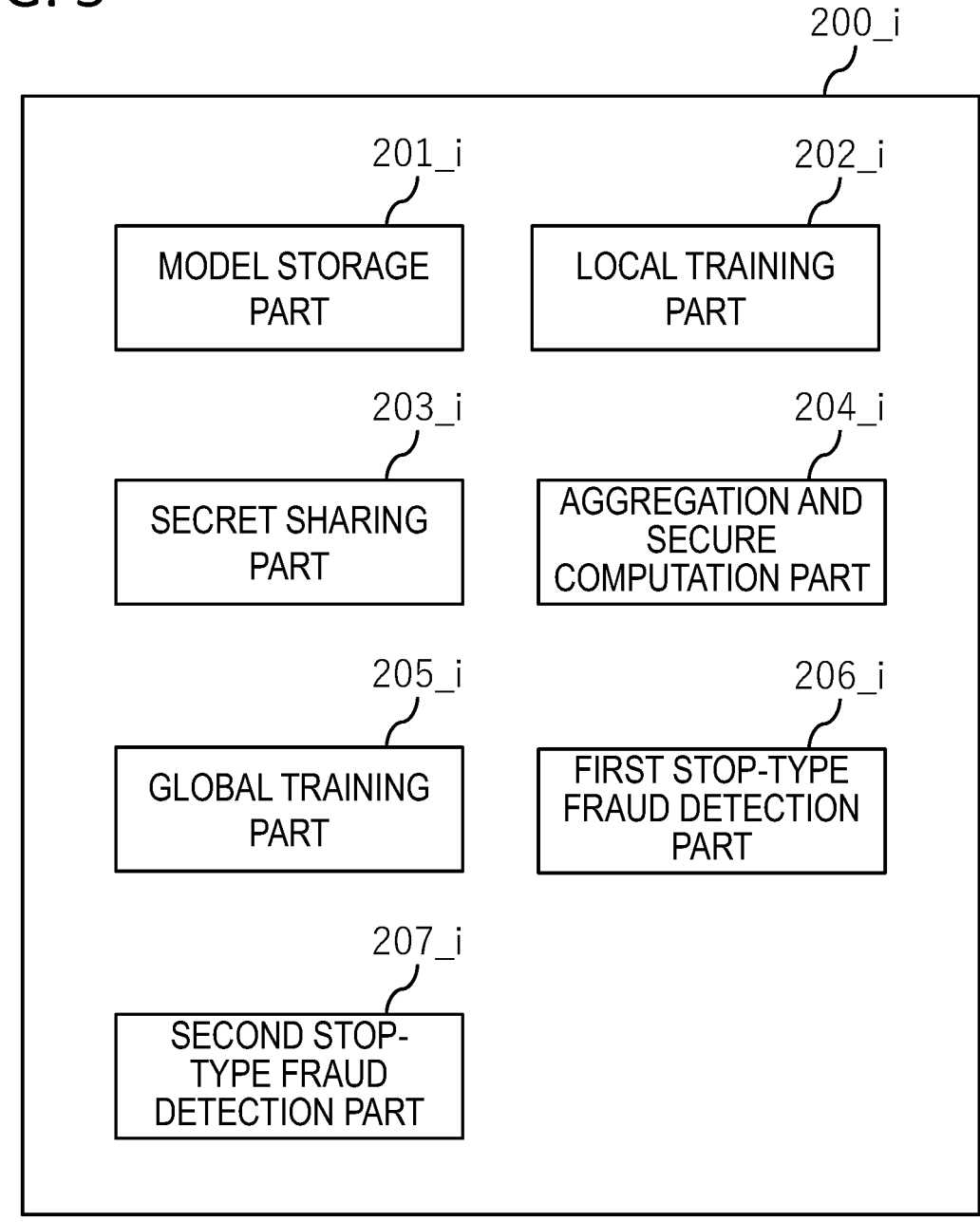
FIG. 5 is a block diagram illustrating a functional configuration example of a federated learning apparatus according to the second example embodiment.

FIG. 5 is a block diagram illustrating a functional configuration example of a federated learning apparatus according to the second example embodiment. As illustrated in FIG. 5, each of the first to Nth federated learning apparatuses 200_$i$ ($i$=0, 1, . . . , N−1) includes a model storage part 201_$i$, a local training part 202_$i$, a secret sharing part 203_$i$, an aggregation and secure computation part 204_$i$, a global training part 205_$i$, a first stop-type fraud detection part 206_$i$, and a second stop-type fraud detection part 207_$i$.

The model storage part 201_$i$ is a storage device for replicating and storing a shared model, which is the target of the federated learning, as a local model. In addition, the local training part 202_$i$ is a processing part for training the local model by using data held by the individual one of the first to Nth federated learning apparatuses 200_$i$ ($i$=0, 1, . . . , N−1).

The secret sharing part 203_$i$ is a processing part for decomposing a local update parameter indicating the training result of the local model into shares based on an additive secret sharing scheme and for transmitting shares to the other federated learning apparatuses 200_$i$.

The additive secret sharing scheme used in the second example embodiment is (N−t)-out-of-N replicated secret sharing [(N−t, N)-RSS], which is a particular form of the additive secret sharing. Since the (N−t)-out-of-N replicated secret sharing is a particular form of the additive secret sharing, a value x is decomposed into a sum on a residue class ring $Z_L$ of modulo L as follows.

$$x = x_0 + \ldots + x_{N-1} \bmod L \qquad \text{[Equation 3]}$$

In the (N−t)-out-of-N replicated secret sharing, the value x decomposed into a sum on the residue class ring $Z_L$ of modulo L is dispersedly held as follows such that the replication is t+1. Note that t(t+1)<N. That is, for example, when N=3, t=1.

$$[x]_{L,(t+1,N,t+1)R} = [x]_{L(t+1,N,t+1)R,0}, \cdots, [x]_{L(t+1,N,t+1)R,N-1)}$$

$$[x]_{L,(t+1,N,t+1)R,i} = (x_i, \ldots, x_{i+t}) \text{ where } x_{(N-1)+1} = x_0 \qquad \text{[Equations 4]}$$

When the value x is held in a secret sharing manner as described above, even if a number t of participants of (among) all the N participants collude with each other to reconstruct the value, the security is ensured. In addition, as will be described below, since the replication is t+1, even if t participants collude with each other and falsify a value, the falsification can be detected, and the processing can be stopped.

The first stop-type fraud detection part 206_$i$ is a processing part that requests the other federated learning apparatuses to transmit the shares of their local update parameters and stops the processing if the shares of the local update parameters transmitted in response to the request do not match.

As described above, in the (N−t)-out-of-N replicated secret sharing, t+1 participants hold replications of the same sub-shares. Thus, even if t participants collude with each other and falsify a value, it is impossible to falsify all the sub-shares to the same values. Thus, the first stop-type fraud detection part 206_$i$ requests other t federated learning apparatuses 200_$i$, which are supposed to hold replications of the same sub-shares as its own sub-shares, to transmit the shares of their local update parameters. If the shares of the local update parameters transmitted in response to the request do not match, the first stop-type fraud detection part 206_$i$ determines that there is a dishonest participant and stops the processing.

In contrast, if the shares of the local update parameters transmitted in response to the request match, the first stop-type fraud detection part 206_$i$ continues the processing and adopts the shares as the accurate shares of the local update parameters. When whether the shares of the local update parameters match is determined, the other federated learning apparatuses 200_$i$ may first convert the shares into hash values by using a hash function and may next transmit the hash values to the first stop-type fraud detection part 206_$i$, instead of directly transmitting the shares. By transmitting the hash values, the communication amount can be reduced.

The aggregation and secure computation part 204_$i$ performs a secure computation for shares of a global update parameter by performing addition of the shares of the local update parameters adopted as the accurate shares of the local update parameters by the first stop-type fraud detection part 206_$i$ and by performing multiplication of the shares by cleartext constants. Concretely, the aggregation and secure computation part 204_$i$ computes a weighted average of local update parameters $\Delta_i$ ($i$=0, 1, . . . , N−1) weighted by data volumes $V_i$ ($i$=0, 1, . . . , N−1) by performing addition of the shares of the local update parameters and multiplication of the shares by cleartext constants.

The second stop-type fraud detection part 207_$i$ is a processing part that stops the processing if the shares of the global update parameter that are received to reconstruct the global update parameter do not match. Because the shares of the global update parameter are held in a secret sharing manner in the first to Nth federated learning apparatuses 200_$i$ ($i$=0, 1, . . . , N−1), it is necessary to aggregate the shares of the global update parameter held in a secret sharing manner in the first to Nth federated learning apparatuses 200_$i$ ($i$=0, 1, . . . , N−1) when the global update parameter is reconstructed. If any of the shares of the global update parameter has been falsified, the global update parameter cannot be reconstructed accurately.

The second stop-type fraud detection part 207_$i$ requests other t+1 federated learning apparatuses 200_$i$, which are supposed to hold replications of the same sub-shares of the global update parameter, to transmit the shares of their global update parameter. If the shares of the global update parameter transmitted in response to the request do not match, the second stop-type fraud detection part 207_$i$ determines that there is a dishonest participant and stops the processing. In contrast, if the shares of the global update parameter transmitted in response to the request match, the second stop-type fraud detection part 207_i adopts the shares as the accurate shares of the global update parameter.

When whether the shares of the global update parameter match is determined, the other federated learning apparatuses 200_i may first convert the shares into hash values by using a hash function and may next transmit the hash values to the second stop-type fraud detection part 207_i, instead of directly transmitting the shares. By transmitting the hash values, the communication amount can be reduced.

The global training part 205_i is a processing part that reconstructs the shares of the global update parameter and that updates the shared model by the global update parameter. The global training part 205_i reconstructs the global update parameter by using the shares adopted as the accurate shares of the global update parameter by the second stop-type fraud detection part 207_i. Next, the global training part 205_i trains the shared model by applying the reconstructed global update parameter to the shared model, which is the target of the federated learning.

As described above, in the federated learning system according to the second example embodiment, since each of the first to Nth federated learning apparatuses 200_i (i=0, 1, . . . , N−1) has the above configuration, it is possible to perform the federated learning while concealing the local update parameters. In the federated learning system according to the second example embodiment, since the processing can be performed only by performing a secure computation with addition and multiplication by cleartext constants (without multiplications), the communication cost is low. In addition, since the federated learning system according to the second example embodiment uses the (N−t)-out-of-N replicated secret sharing of which the replication is t+1, even if t participants collude with each other and falsify a value, the federated learning system can detect the falsification and stop the processing.

Method

Figure 6:
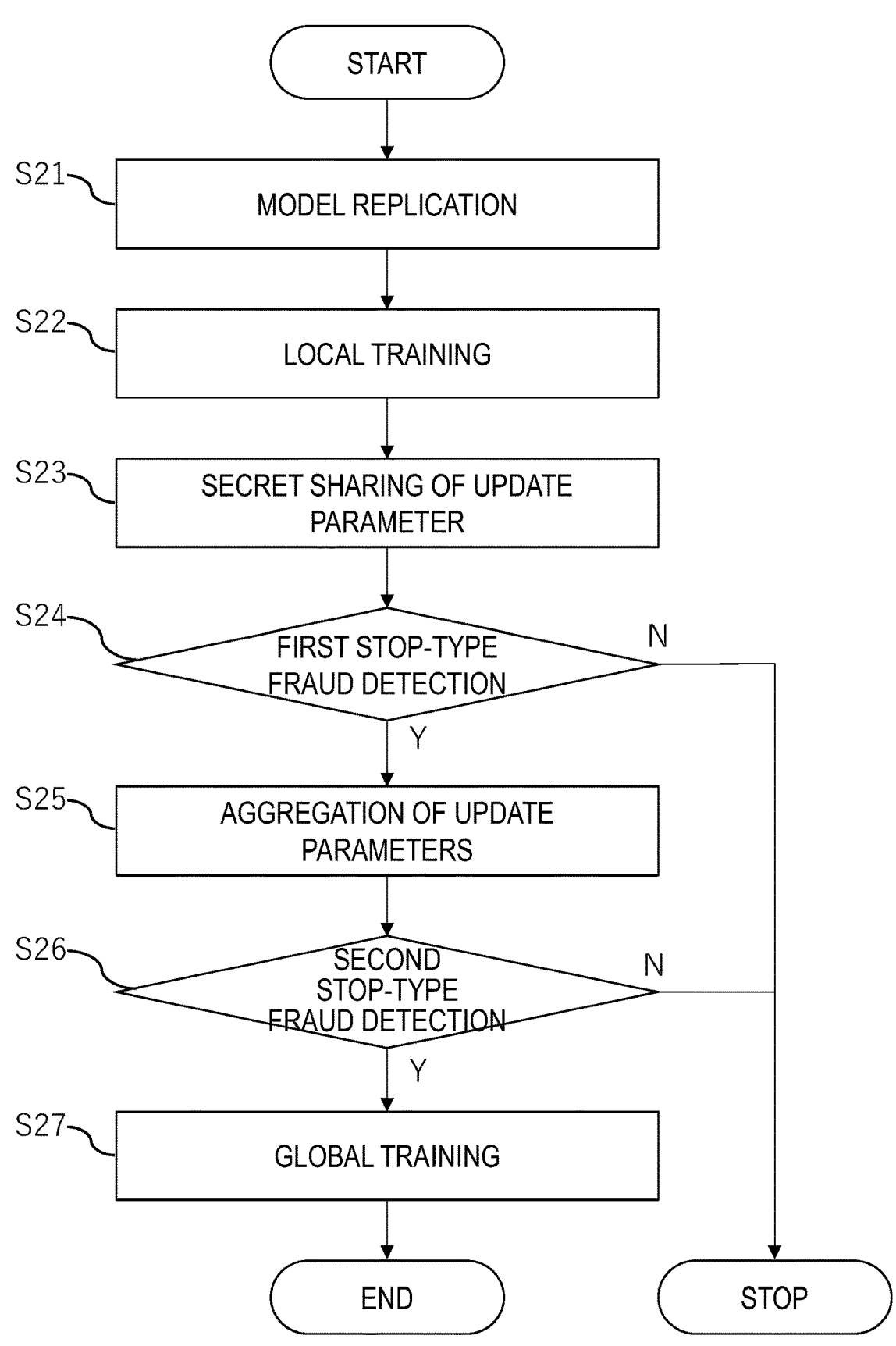
FIG. 6 is a flowchart illustrating an outline of a procedure of a federated learning method according to the second example embodiment.

Next, a federated learning method according to the second example embodiment will be described. FIG. 6 is a flowchart illustrating an outline of a procedure of the federated learning method according to the second example embodiment.

As illustrated in FIG. 6, the federated learning method according to the second example embodiment includes a model replication step (S21), a local training step (S22), an update parameter secret sharing step (S23), a step of first stop-type fraud detection step (S24), an update parameter aggregation step (S25), a second stop-type fraud detection step (S26), and a global training step (S27).

In the model replication step (S21), each of the first to Nth federated learning apparatuses 200_i (i=0, 1, . . . , N−1) replicates and stores a shared model, which is the target of the federated learning, as a local model. Next, in the local training step (S22), each of the first to Nth federated learning apparatuses 200_i (i=0, 1, . . . , N−1) trains the local model by using the data held thereby.

In the update parameter secret sharing step (S23), each of the first to Nth federated learning apparatuses 200_i (i=0, 1, . . . , N−1) decomposes a local update parameter obtained in the local training step (S22) into shares based on an additive secret sharing scheme and transmits shares to the other federated learning apparatuses 200_i (i=0, 1, . . . , N−1). In this step, the above (N−t)-out-of-N replicated secret sharing is used as the additive secret sharing scheme.

That is, in the additive secret sharing scheme according to the second example embodiment, the value x decomposed into a sum on the residue class ring $Z_L$ of modulo L is distributed in a secret sharing manner such that the replication is t+1.

In the (N−t)-out-of-N replicated secret sharing, t+1 participants hold replications of the same sub-shares. Thus, even if t participants collude with each other and falsify a value, it is impossible to falsify all the sub-shares to the same values. Thus, in the first stop-type fraud detection step (S24), the first stop-type fraud detection part 206_i requests other t federated learning apparatuses 200_i, which are supposed to hold replications of the same sub-shares as its own sub-shares, to transmit the shares of their local update parameters. If the shares of the local update parameters transmitted in response to the request do not match, the first stop-type fraud detection part 206_i determines that there is a dishonest participant.

In the first stop-type fraud detection step (S24), each of the first to Nth federated learning apparatuses 200_i (i=0, 1, . . . , N−1) requests the other federated learning apparatuses to transmit the shares of their local update parameters. If the shares of the local update parameters transmitted in response to the request do not match (S24; N), the first stop-type fraud detection part 206_i determines that there is a dishonest participant and stops the processing.

In contrast, in the first stop-type fraud detection step (S24), if each of the first to Nth federated learning apparatuses 200_i (i=0, 1, . . . , N−1) determines that the shares of the local update parameters transmitted in response to the request match (S24; Y), its first stop-type fraud detection part 206_i continues the processing and adopts the shares as the accurate shares of the local update parameters.

In the update parameter aggregation step (S25), each of the first to Nth federated learning apparatuses 200_i (i=0, 1, . . . , N−1) performs a secure computation for shares of a global update parameter by performing addition of the shares of the local update parameters adopted as the accurate shares of the local update parameters in the first stop-type fraud detection step (S24) and by performing multiplication of the shares by cleartext constants. In the update parameter aggregation step (S25), each of the first to Nth federated learning apparatuses 200_i (i=0, 1, . . . , N−1) computes a weighted average of the local update parameters $\Delta_i$ (i=0, 1, . . . , N−1) weighted by the data volumes $V_i$ (i=0, 1, . . . , N−1) by performing addition of the shares of the local update parameters and multiplication of the shares by cleartext constants.

In the second stop-type fraud detection step (S26), if each of the first to Nth federated learning apparatuses 200_i (i=0, 1, . . . , N−1) determines that the shares of the global update parameter that are received to reconstruct the global update parameter do not match, its second stop-type fraud detection part 207_i stops the processing.

In the second stop-type fraud detection step (S26), the second stop-type fraud detection part 207_i requests other t+1 federated learning apparatuses 200_i, which are supposed to hold replications of the same sub-shares of the global update parameter, to transmit their shares. If the shares of the global update parameter transmitted in response to the request do not match (S26; N), the second stop-type fraud detection part 207_i determines that there is a dishonest participant and stops the processing. In contrast, if the shares of the global update parameter transmitted in response to the request match (S26; Y), the second stop-type fraud detection part 207_i adopts the shares as the accurate shares of the global update parameter.

In the global training step (S27), each of the first to Nth federated learning apparatuses 200_*i* (i=0, 1, . . . , N−1) reconstructs the shares of the global update parameter and updates the shared model by the global update parameter. Each of the first to Nth federated learning apparatuses 200_*i* (i=0, 1, . . . , N−1) reconstructs the global update parameter by using the shares adopted as the accurate shares of the global update parameter in the second stop-type fraud detection step (S26). Next, each of the first to Nth federated learning apparatuses 200_*i* (i=0, 1, . . . , N−1) trains the shared model by applying the reconstructed global update parameter to the shared model, which is the target of the federated learning.

As described above, in the federated learning method according to the second example embodiment, since each of the first to Nth federated learning apparatuses 200_*i* (i=0, 1, . . . , N−1) has the above configuration, it is possible to perform the federated learning while concealing the local update parameters. In the federated learning method according to the second example embodiment, since the processing can be performed only by performing a secure computation with addition and multiplication by cleartext constants (without multiplications), the communication cost is low. In addition, since the federated learning system according to the second example embodiment uses the (N−t)-out-of-N replicated secret sharing of which the replication is t+1, even if t participants collude with each other and falsify a value, the federated learning system can detect the falsification and stop the processing.

Third Example Embodiment

Hereinafter, a federated learning system and federated learning apparatuses according to a third example embodiment will be described with reference to FIGS. 7 and 8.

Figure 7:
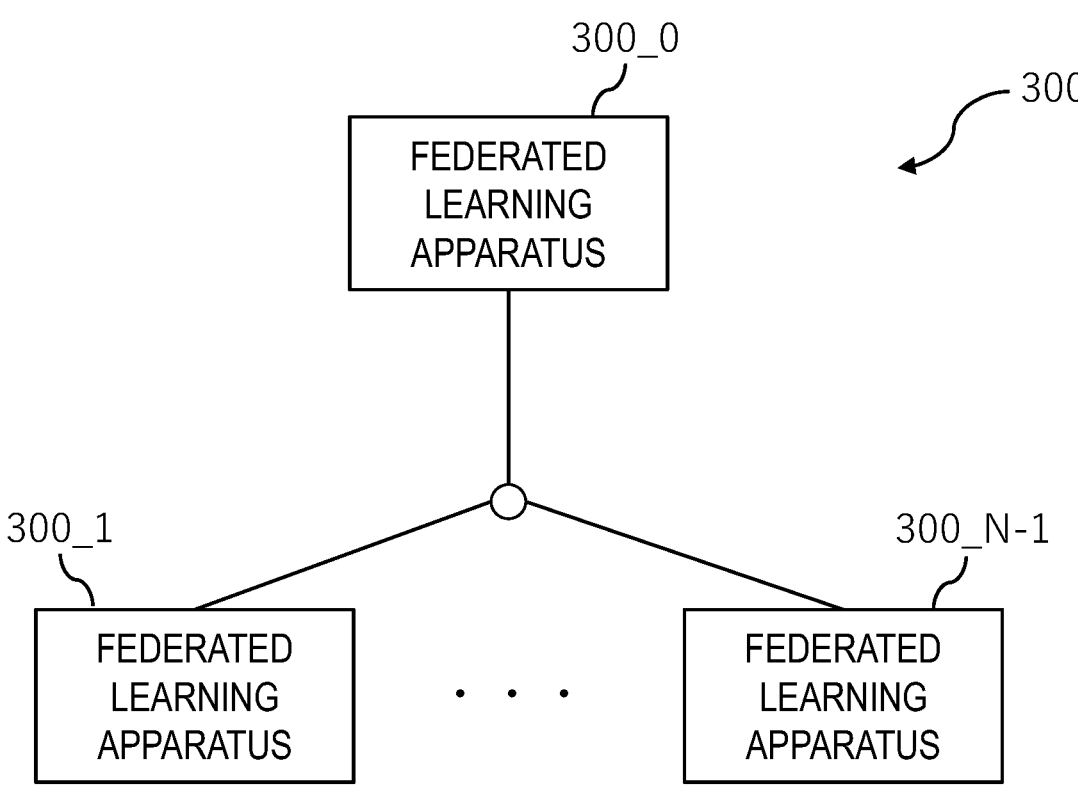
FIG. 7 is a block diagram illustrating a functional configuration example of a federated learning system according to a third example embodiment.

FIG. 7 is a block diagram illustrating a functional configuration example of the federated learning system according to the third example embodiment. As illustrated in FIG. 7, a federated learning system 300 according to the third example embodiment includes first to Nth federated learning apparatuses 300_*i* (i=0, 1, . . . , N−1). These first to Nth federated learning apparatuses 300_*i* (i=0, 1, . . . , N−1) are connected to each other via a network such that these apparatuses can communicate with each other. N is a natural number of 4 or more.

As in the other example embodiments, the first to Nth federated learning apparatuses 300_*i* (i=0, 1, . . . , N−1) are each operated by an independent organization (user). Although the first to Nth federated learning apparatuses 300_*i* (i=0, 1, . . . , N−1) do not wish to disclose their own data to the outside, these federated learning apparatuses 300_*i* wish to mutually utilize their data and to perform machine learning on a shared model.

FIG. 8 is a block diagram illustrating a functional configuration example of a federated learning apparatus according to the third example embodiment. As illustrated in FIG. 8, each of the first to Nth federated learning apparatuses 300_*i* (i=0, 1, . . . , N−1) includes a model storage part 301_*i*, a local training part 302_*i*, a secret sharing part 303_*i*, an aggregation and secure computation part 304_*i*, a global training part 305_*i*, a first nonstop-type fraud detection part 306_*i*, and a second nonstop-type fraud detection part 307_*i*.

The model storage part 301_*i* is a storage device for replicating and storing a shared model, which is the target of the federated learning, as a local model. In addition, the local training part 302_*i* is a processing part for training the local model by using data held by the individual one of the first to Nth federated learning apparatuses 300_*i* (i=0, 1, . . . , N−1).

The secret sharing part 303_*i* is a processing part for decomposing a local update parameter indicating the training result of the local model to shares based on an additive secret sharing scheme and for transmitting shares to the other federated learning apparatuses 300_*i*.

The additive secret sharing scheme used in the third example embodiment is (N−2t)-out-of-N replicated secret sharing [(N−2t, N)-RSS], which is a particular form of the additive secret sharing. Since the (N−2t)-out-of-N replicated secret sharing is a particular form of the additive secret sharing, a value x is decomposed into a sum on a residue class ring $Z_L$ of modulo L as follows.

$$x = x_0 + \ldots + x_{N-1} \bmod L \qquad \text{[Equation 5]}$$

In the (N−2t)-out-of-N replicated secret sharing, the value x decomposed into a sum on the residue class ring $Z_L$ of modulo L is dispersedly held as follows such that the replication is 2t+1. Note that t(2t+1)<N. That is, for example, when N=4, t=1.

$$[x]_{L,(t+1,N,2t+1)R} = [x]_{L(t+1,N,2t+1)R,0}, \qquad \cdot \qquad \cdot \qquad \cdot \qquad ,$$
$$[x]_{L(t+1,N,2t+1)R,N-1})$$

$$[x]_{L,(t+1,N,2t+1)R,i} = x_i, \ldots, x_{i+2t}) \text{ where } x_{(N-1)+1} = x_0 \qquad \text{[Equations 6]}$$

When the value x is held in a secret sharing manner as described above, even if a number t of participants among all the N participants collude with each other to reconstruct the value, the security is ensured. In addition, as will be described below, since the replication is 2t+1, even if t participants collude with each other and falsify a value, the accurate values can be selected, and the processing can be continued.

The first nonstop-type fraud detection part 306_*i* is a processing part that requests the other federated learning apparatuses to transmit the shares of their local update parameters and adopts, of all the shares of the local update parameters transmitted in response to the request, a majority of shares that match, as the accurate shares of the local update parameters.

As described above, in the (N−2t)-out-of-N replicated secret sharing, 2t+1 participants hold replications of the same sub-shares. Thus, even if t participants collude with each other and falsify a value, it is impossible to falsify all the sub-shares to the same values, and t+1 participants hold the accurate values. That is, a majority of the values are accurate values. The first nonstop-type fraud detection part 306_*i* requests other 2t federated learning apparatuses 300_*i*, which are supposed to hold replications of the same sub-share as its own sub-shares, to transmit the shares of their local update parameters and adopts, of all the shares of the local update parameters transmitted in response to the request, a majority of shares that match, as accurate shares.

If federated learning apparatuses 300_*i* that provide local update parameters are operated by attackers and if falsification has already been made at the time when the federated learning apparatuses 300_*i* have distributed their local update parameters in a secret sharing manner, a majority of shares of the local update parameters could not match. In this case, the first nonstop-type fraud detection part 306_*i* does not adopt these local update parameters and continues the processing by recognizing the parameters as if the parameters were not present.

When whether the shares of the local update parameters match is determined, the other federated learning apparatuses 200_i may first convert the shares into hash values by using a hash function and may next transmit the hash values to the first nonstop-type fraud detection part 306_i, instead of directly transmitting the shares. By transmitting the hash values, the communication amount can be reduced.

The aggregation and secure computation part 304_i performs a secure computation for shares of a global update parameter by performing addition of the shares of the local update parameters adopted as the accurate shares of the local update parameters by the first nonstop-type fraud detection part 306_i and by performing multiplication of the shares by cleartext constants. Concretely, the aggregation and secure computation part 304_i computes a weighted average of local update parameters $\Delta_i$ (i=0, 1, . . . , N−1) weighted by data volumes $V_i$ (i=0, 1, . . . , N−1) by performing addition of the shares of the local update parameters and multiplication of the shares by cleartext constants.

The second nonstop-type fraud detection part 307_i adopts, of all the shares of the global update parameter received to reconstruct the global update parameter, a majority of shares that match, as the accurate shares of the global update parameter. The second nonstop-type fraud detection part 307_i requests other 2t federated learning apparatuses 300_i, which are supposed to hold replications of the same sub-shares of the global update parameter, to transmit the shares of their global update parameter, and adopts, of all the shares of the global update parameter transmitted in response to the request, a majority of shares that match, as accurate values.

When whether the shares of the global update parameter match is determined, the other federated learning apparatuses 300_i may first convert the shares into hash values by using a hash function and may next transmit the hash values to the second nonstop-type fraud detection part 307_i, instead of directly transmitting the shares. By transmitting the hash values, the communication amount can be reduced.

The global training part 305_i is a processing part that reconstructs the shares of the global update parameter and that updates the shared model by the global update parameter. The global training part 305_i reconstructs the global update parameter by using the shares adopted as the accurate shares of the global update parameter by the second nonstop-type fraud detection part 307_i. Next, the global training part 305_i trains the shared model by applying the reconstructed global update parameter to the shared model, which is the target of the federated learning.

As described above, in the federated learning system according to the third example embodiment, since each of the first to Nth federated learning apparatuses 300_i (i=0, 1, . . . , N−1) has the above configuration, it is possible to perform the federated learning while concealing the local update parameters. In the federated learning system according to the third example embodiment, since the processing can be performed only by performing a secure computation with addition and multiplication by cleartext constants (without multiplications), the communication cost is low. In addition, since the federated learning system according to the third example embodiment uses the (N−2t)-out-of-N replicated secret sharing of which the replication is 2t+1, even if t participants collude with each other and falsify a value, the federated learning system can continue the processing by selecting the accurate values.

Method

Figure 9:
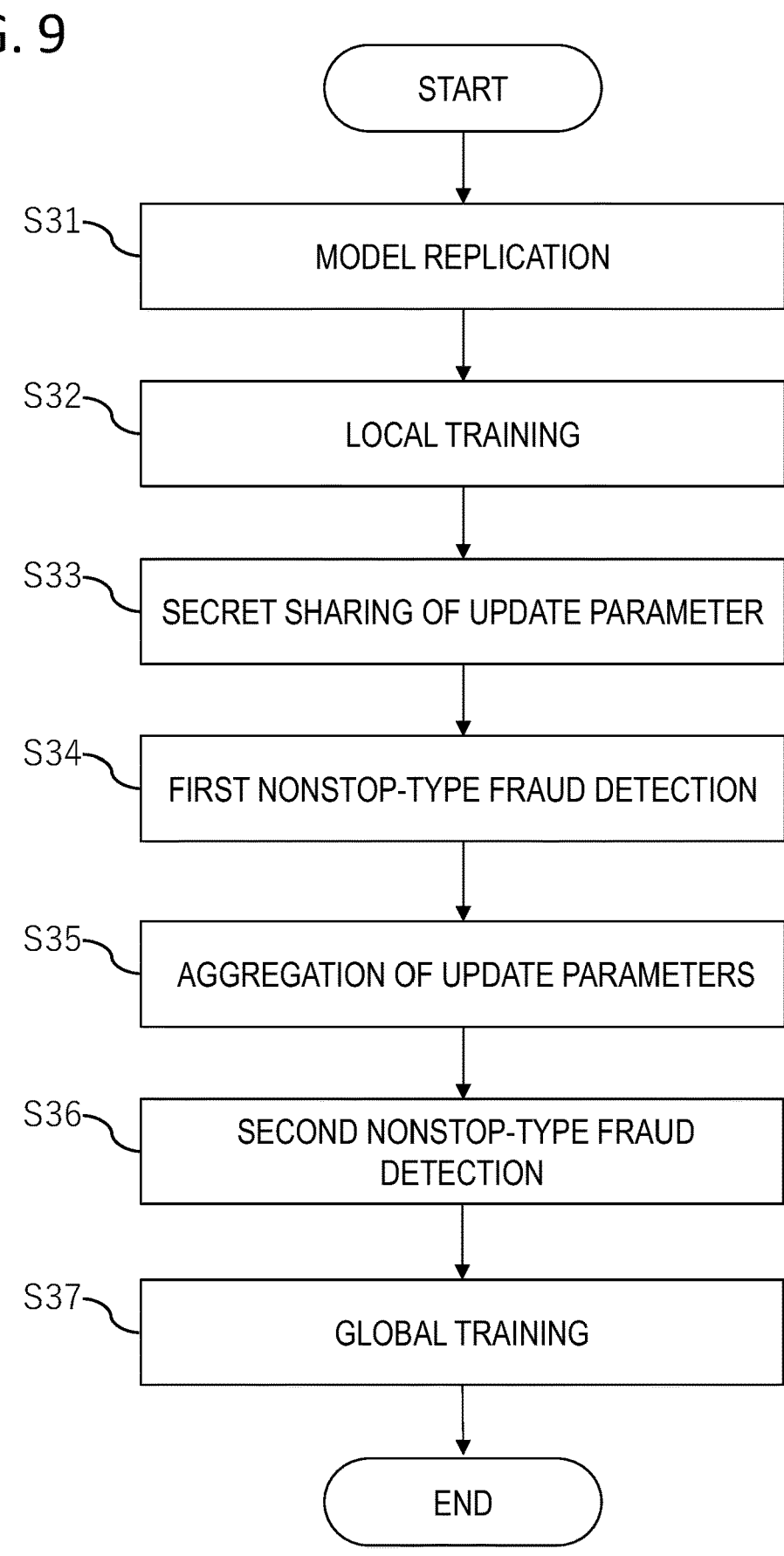
FIG. 9 is a flowchart illustrating an outline of a procedure of a federated learning method according to the third example embodiment.

Next, a federated learning method according to the third example embodiment will be described. FIG. 9 is a flow-chart illustrating an outline of a procedure of the federated learning method according to the third example embodiment.

As illustrated in FIG. 9, the federated learning method according to the third example embodiment includes a model replication step (S31), a local training step (S32), an update parameter secret sharing step (S33), a first nonstop-type fraud detection step (S34), an update parameter aggregation step (S35), a second nonstop-type fraud detection step (S36), and a global training step (S37).

In the model replication step (S31), each of the first to Nth federated learning apparatuses 300_i (i=0, 1, . . . , N−1) replicates and stores a shared model, which is the target of the federated learning, as a local model. Next, in the local training step (S32), each of the first to Nth federated learning apparatuses 300_i (i=0, 1, . . . , N−1) trains the local model by using the data held thereby.

In the update parameter secret sharing step (S33), each of the first to Nth federated learning apparatuses 300_i (i=0, 1, . . . , N−1) decomposes a local update parameter obtained in the local training step (S32) to shares based on an additive secret sharing scheme and transmits shares to the other federated learning apparatuses 300_i. In this step, the above (N−2t)-out-of-N replicated secret sharing is used as the additive secret sharing scheme. That is, in the additive secret sharing scheme according to the third example embodiment, the value x decomposed into a sum on the residue class ring $Z_L$ of modulo L is distributed in a secret sharing manner such that the replication is 2t+1.

In the (N−2t)-out-of-N replicated secret sharing, 2t+1 participants hold replications of the same sub-shares. Thus, even if t participants collude with each other and falsify a value, it is impossible to falsify all the sub-shares to the same values. In other words, t+1 participants hold the accurate values. That is, a majority of the values are accurate values. In the first nonstop-type fraud detection step (S34), the first nonstop-type fraud detection part 306_i requests other 2t federated learning apparatuses 300_i, which are supposed to hold replications of the same sub-shares as its own sub-shares, to transmit the shares of their local update parameters and adopts, of all the shares of the local update parameters transmitted in response to the request, a majority of shares that match, as accurate values.

In the update parameter aggregation step (S35), each of the first to Nth federated learning apparatuses 300_i (i=0, 1, . . . , N−1) performs a secure computation for shares of a global update parameter by performing addition of the shares of the local update parameters adopted as the accurate shares of the local update parameters in the first nonstop-type fraud detection step (S34) and by performing multiplication of the shares by cleartext constants. In the update parameter aggregation step (S35), the aggregation and secure computation part 304_i computes a weighted average of local update parameters $\Delta_i$ (i=0, 1, . . . , N−1) weighted by the data volumes $V_i$ (i=0, 1, . . . , N−1) by performing addition of the shares of the local update parameters and multiplication of the shares by cleartext constants.

In the second nonstop-type fraud detection step (S36), each of the first to Nth federated learning apparatuses 300_i (i=0, 1, . . . , N−1) adopts, of all the shares of the global update parameter received to reconstruct the global update parameter, a majority of shares that match, as the accurate shares of the global update parameter.

In the second nonstop-type fraud detection step (S36), the second nonstop-type fraud detection part 307_i requests other 2t federated learning apparatuses 300_i, which are supposed to hold replications of the same sub-shares of the global update parameter, to transmit the shares of their global update parameter, and adopts, of all the shares of the global update parameter transmitted in response to the request, a majority of shares that match, as the accurate shares of the global update parameter.

In the global training step (S37), each of the first to Nth federated learning apparatuses 300_i (i=0, 1, . . . , N–1) reconstructs the shares of the global update parameter and updates the shared model by the global update parameter. In the second nonstop-type fraud detection step (S36), each of the first to Nth federated learning apparatuses 300_i (i=0, 1, . . . , N–1) reconstructs the global update parameter by using the shares adopted as the accurate shares of the global update parameter. Next, each of the first to Nth federated learning apparatuses 300_i (i=0, 1, . . . , N–1) trains the shared model by applying the reconstructed global update parameter to the shared model, which is the target of the federated learning.

As described above, in the federated learning method according to the third example embodiment, since each of the first to Nth federated learning apparatuses 300_i (i=0, 1, . . . , N–1) has the above configuration, it is possible to perform the federated learning while concealing the local update parameters. In the federated learning method according to the third example embodiment, since the processing can be performed only by performing a secure computation with addition and multiplication by cleartext constants (without multiplications), the communication cost is low. In addition, since the federated learning system according to the third example embodiment uses the (N–2t)-out-of-N replicated secret sharing of which the replication is 2t+1, even if t participants collude with each other and falsify a value, the federated learning system can continue the processing by selecting the accurate values.

Fourth Example Embodiment

Next, a federated learning system, federated learning server apparatuses, and federated learning client apparatuses according to a fourth example embodiment will be described with reference to FIGS. 10 to 12.

Figure 10:
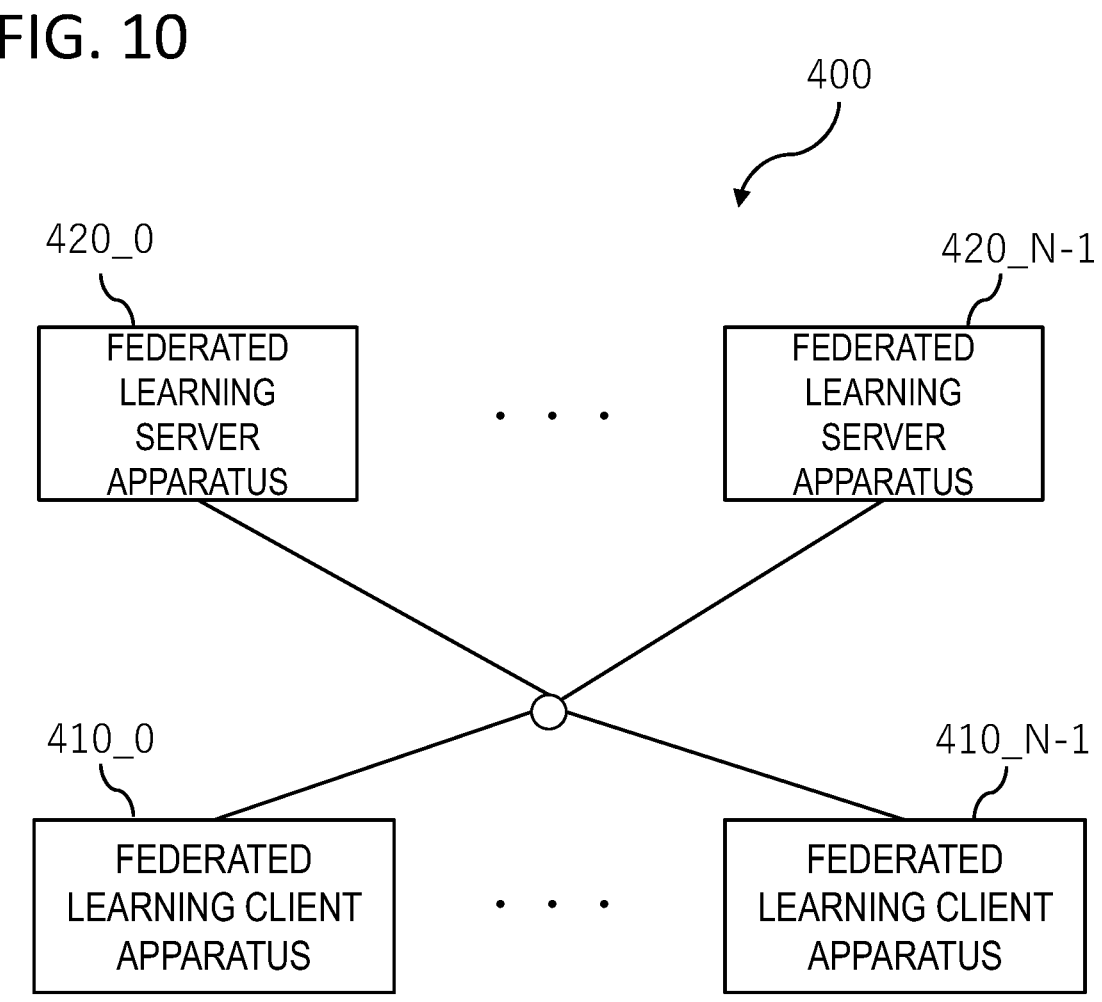
FIG. 10 is a block diagram illustrating a functional configuration example of a federated learning system according to a fourth example embodiment.

FIG. 10 is a block diagram illustrating a functional configuration example of the federated learning system according to the fourth example embodiment. As illustrated in FIG. 10, a federated learning system 400 according to the fourth example embodiment includes first to Nth federated learning client apparatuses 410_i (i=0, 1, . . . , N–1) and first to Nth federated learning server apparatuses 420_i (i=0, 1, . . . , N–1). The first to Nth federated learning client apparatuses 410_i (i=0, 1, . . . , N–1) and the first to Nth federated learning server apparatuses 420_i (i=0, 1, . . . , N–1) are connected to each other via a network such that these apparatuses can communicate with each other. N is a natural number of 2 or more.

The first to Nth federated learning client apparatuses 410_i (i=0, 1, . . . , N–1) are each operated by an independent organization (user). In addition, the first to Nth federated learning client apparatuses 410_i (i=0, 1, . . . , N–1) store data that their respective organizations do not wish to disclose to the outside. Although the organizations does not wish to disclose their own data to the outside, these organizations wish to mutually utilize their data and to perform machine learning on a shared model. In addition, the first to Nth federated learning server apparatuses 420_i (i=0, 1, . . . , N–1) are each operated by an independent organization (user).

That is, the federated learning system 400 according to the fourth example embodiment is a server-client federated learning system. More specifically, as will be described below, the federated learning system 400 according to the fourth example embodiment is a federated learning system obtained by dividing the apparatuses included in the federated learning system 100 according to the first example embodiment into a group of apparatuses serving as servers and a group of apparatuses serving as clients. Thus, although the first to Nth federated learning client apparatuses 410_i (i=0, 1, . . . , N–1) and the first to Nth federated learning server apparatuses 420_i (i=0, 1, . . . , N–1) are distinguished from each other for convenience of description, these apparatuses can adopt the same hardware configuration. If the same hardware configuration is adopted, for example, a program that limits one or more functions may be executed.

Figure 11:
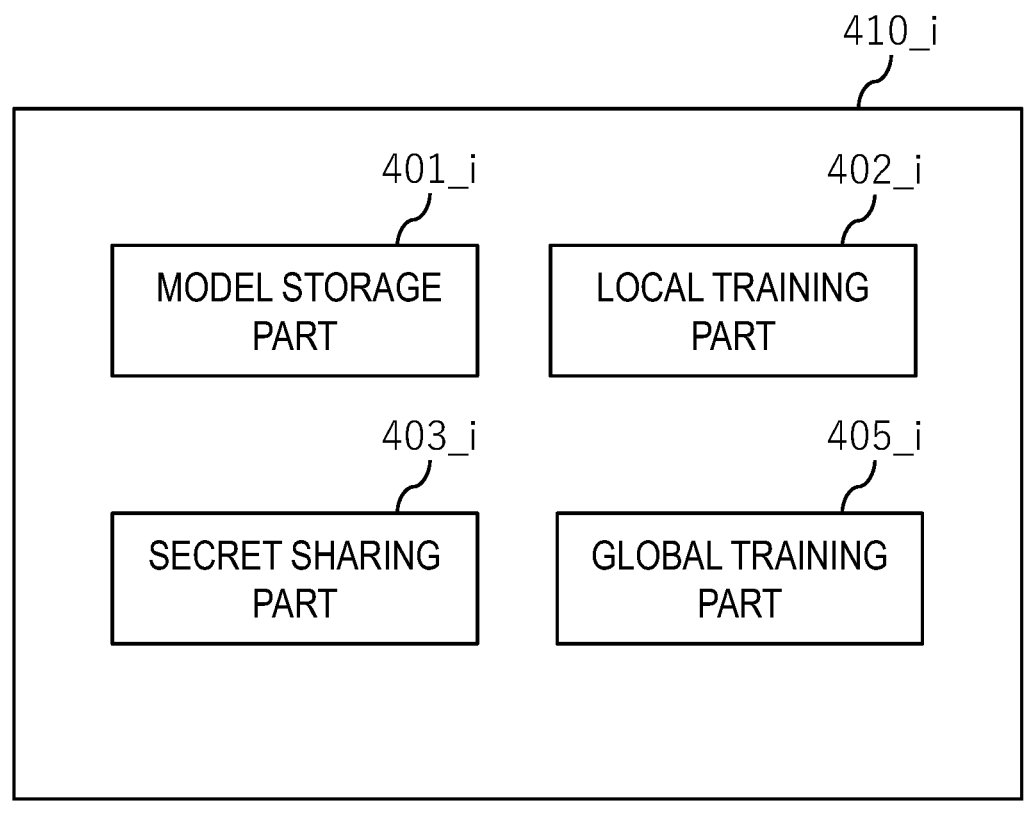
FIG. 11 is a block diagram illustrating a functional configuration example of a federated learning client apparatus according to the fourth example embodiment.
Figure 12:
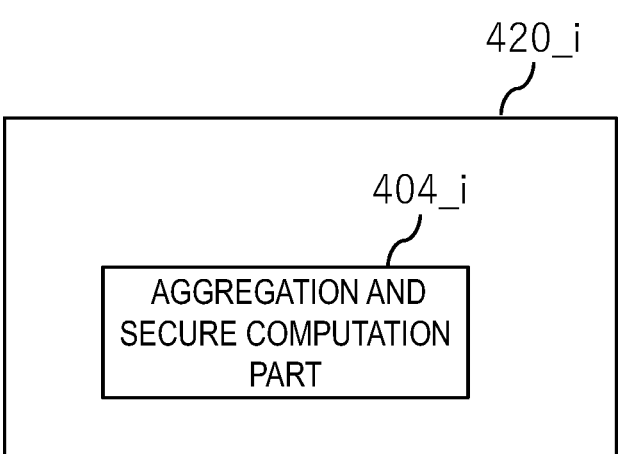
FIG. 12 is a block diagram illustrating a functional configuration example of a federated learning server apparatus according to the fourth example embodiment.

FIG. 11 is a block diagram illustrating a functional configuration example of a federated learning client apparatus according to the fourth example embodiment. As illustrated in FIG. 11, each of the first to Nth federated learning client apparatuses 410_i (i=0, 1, . . . , N–1) includes a model storage part 401_i, a local training part 402_i, a secret sharing part 403_i, and a global training part 405_i. FIG. 12 is a block diagram illustrating a functional configuration example of a federated learning server apparatus according to the fourth example embodiment. As illustrated in FIG. 12, each of the first to Nth federated learning server apparatuses 420_i (i=0, 1, . . . , N–1) includes an aggregation and secure computation part 404_i.

The model storage part 401_i of each of the first to Nth federated learning client apparatuses 410_i (i=0, 1, . . . , N–1) is a storage device for replicating and storing a shared model, which is the target of the federated learning, as a local model. In addition, the local training part 402_i is a processing part for training the local model by using data held by the individual one of the first to Nth federated learning client apparatuses 410_i (i=0, 1, . . . , N–1).

The secret sharing part 403_i of each of the first to Nth federated learning client apparatuses 410_i (i=0, 1, . . . , N–1) is a processing part for decomposing a local update parameter indicating the training result of the local model into shares based on an additive secret sharing scheme and for transmitting the shares to the first to Nth federated learning client apparatuses 410_i (i=0, 1, . . . , N–1).

The additive secret sharing scheme used in the fourth example embodiment is N-out-of-N additive secret sharing. That is, the secret sharing part 403_i decomposes the local update parameter indicating the training result of the local model into a sum on a residue class ring $Z_L$ of modulo L and transmits the values obtained by the decomposition to the first to Nth federated learning server apparatuses 420_i (i=0, 1, . . . , N–1) such that the replication is 1.

The aggregation and secure computation part 404_i of each of the first to Nth federated learning server apparatuses 420_i (i=0, 1, . . . , N–1) performs a secure computation for the shares of a global update parameter by performing addition of the shares of the local update parameters received from the first to Nth federated learning client apparatuses 410_i (i=0, 1, . . . , N–1) and by performing multiplication of the shares by cleartext constants. Concretely, the aggregation and secure computation part 404_i computes a weighted average of local update parameters $\Delta_i$ (i=0, 1, . . . , N–1) weighted by data volumes $V_i$ (i=0, 1 N–1) by performing addition of the shares of the local update parameters and multiplication of the shares by cleartext constants.

The global training part 405_i of each of the first to Nth federated learning client apparatuses 410_i (i=0, 1, . . . , N–1) is a processing part for reconstructing the shares of a global update parameter and updating the shared model. The global training part 405_*i* reconstructs a global update parameter by using the shares adopted as the shares of the global update parameter received from the first to Nth federated learning server apparatuses 420_*i* (i=0, 1, . . . , N−1). Next, the global training part 405_*i* trains the shared model by applying the reconstructed global update parameter to the shared model, which is the target of the federated learning.

As described above, in the federated learning system according to the fourth example embodiment, since the first to Nth federated learning client apparatuses 410_*i* (i=0, 1, N−1) and the first to Nth federated learning server apparatuses 420_*i* (i=0, 1, . . . , N−1) have their respective configurations described above, it is possible to perform the federated learning while concealing the local update parameters. In the federated learning system according to the fourth example embodiment, since the processing can be performed only by performing a secure computation with addition and multiplication by cleartext constants (without multiplications), the communication cost is low. Since the federated learning system according to the fourth example embodiment uses the N-out-of-N additive secret sharing of which the replication is 1, the federated learning system has a high security against collusion attacks.

Method

Figure 13:
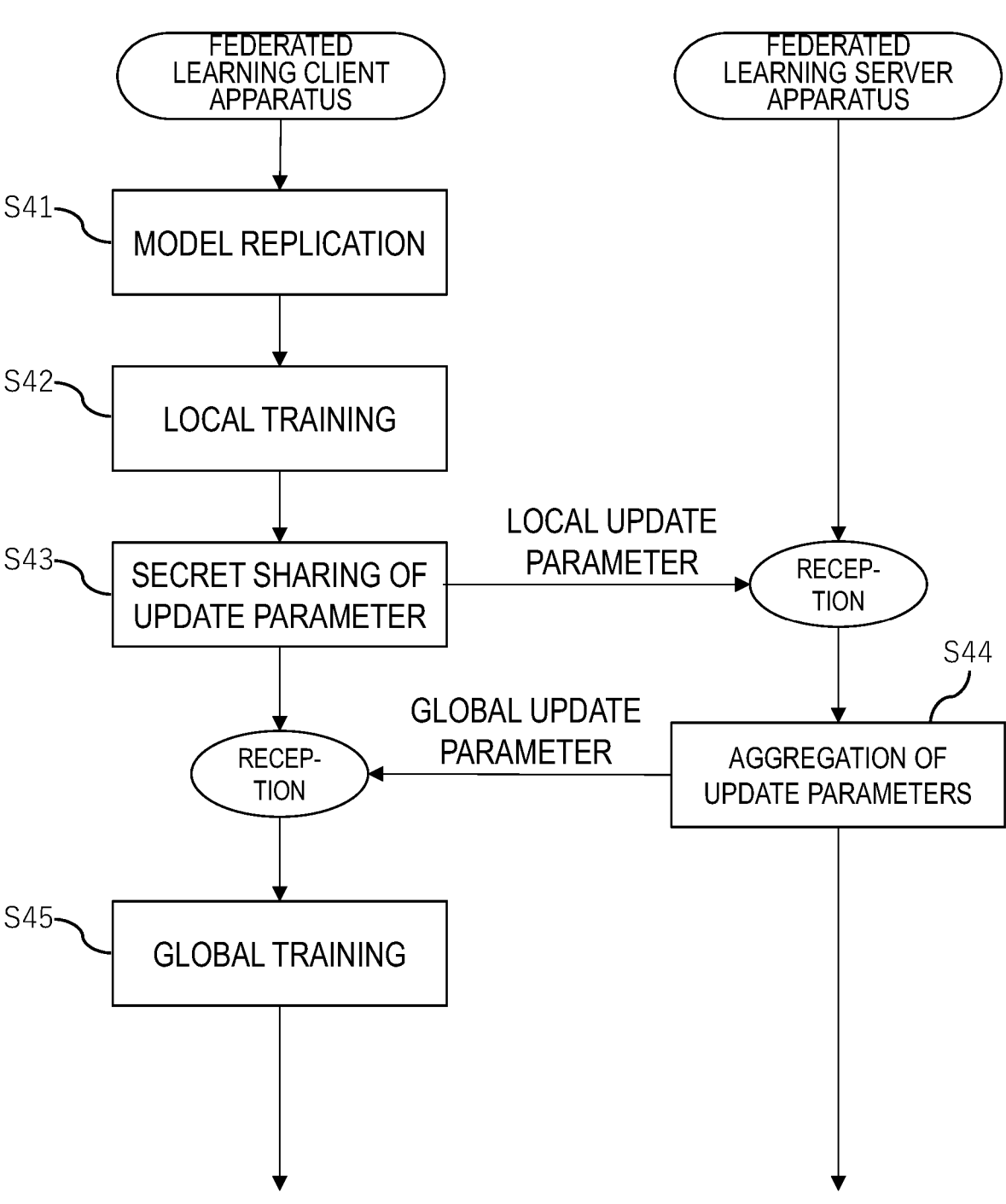
FIG. 13 is a system flowchart illustrating an outline of a procedure of a federated learning method according to the fourth example embodiment.

Next, a federated learning method according to the fourth example embodiment will be described. FIG. 13 is a system flowchart illustrating an outline of a procedure of the federated learning method according to the fourth example embodiment.

As illustrated in FIG. 13, the federated learning method according to the fourth example embodiment includes the processing performed by the first to Nth federated learning client apparatuses 410_*i* (i=0, 1, . . . , N−1) and the processing performed by the first to Nth federated learning server apparatuses 420_*i* (i=0, 1, . . . , N−1). The processing performed by the first to Nth federated learning client apparatuses 410_*i* (i=0, 1, . . . , N−1) includes a model replication step (S41), a local training step (S42), an update parameter secret sharing step (S43), and a global training step (S45). The processing performed by the first to Nth federated learning server apparatuses 420_*i* (i=0, 1, . . . , N−1) includes an update parameter aggregation step (S44).

In the model replication step (S41), each of the first to Nth federated learning client apparatuses 410_*i* (i=0, 1, . . . , N−1) replicates and stores a shared model, which is the target of the federated learning, as a local model. In the local training step (S42), each of the first to Nth federated learning client apparatuses 410_*i* (i=0, 1, . . . , N−1) trains the local model by using the data held thereby.

In the update parameter secret sharing step (S43), each of the first to Nth federated learning client apparatuses 410_*i* (i=0, 1, . . . , N−1) decomposes a local update parameter obtained in the local training step (S42) to shares based on an additive secret sharing scheme and transmits the shares to the first to Nth federated learning server apparatuses 420_*i* (i=0, 1, . . . , N−1). In this step, the above N-out-of-N additive secret sharing is used as the additive secret sharing scheme. That is, the replication of the additive secret sharing scheme according to the fourth example embodiment is 1, and a different share is transmitted to each of the first to Nth federated learning server apparatuses 420_*i* (i=0, 1, . . . , N−1).

In the update parameter aggregation step (S44), each of the first to Nth federated learning server apparatuses 420_*i* (i=0, 1, . . . , N−1) performs a secure computation for the shares of a global update parameter by performing addition of the received shares of the local update parameters and multiplication of the shares by cleartext constants. Concretely, each of the first to Nth federated learning server apparatuses 420_*i* (i=0, 1, . . . , N−1) computes a weighted average of the local update parameters $\Delta_i$ (i=0, 1, . . . , N−1) weighted by their respective data volumes $V_i$ (i=0, 1, . . . , N−1).

In the global training step (S45), each of the first to Nth federated learning client apparatuses 410_*i* (i=0, 1, . . . , N−1) reconstructs the shares of the global update parameter and updates the shared model by the global update parameter. Concretely, each of the first to Nth federated learning client apparatuses 410_*i* (i=0, 1, . . . , N−1) receives the shares of a global update parameter distributed in a secret sharing manner from the first to Nth federated learning server apparatuses 420_*i* (i=0, 1, . . . , N−1) and reconstructs the global update parameter. Next, each of the first to Nth federated learning client apparatuses 410_*i* (i=0, 1, . . . , N−1) trains the shared model by applying the reconstructed global update parameter to the shared model, which is the target of the federated learning.

As described above, in the federated learning method according to the fourth example embodiment, the first to Nth federated learning client apparatuses 410_*i* (i=0, 1, . . . , N−1) and the first to Nth federated learning server apparatuses 420_*i* (i=0, 1, . . . , N−1) can perform the federated learning while concealing the local update parameters by coordinating with each other. In the federated learning system according to the fourth example embodiment, since the processing can be performed only by performing a secure computation with addition and multiplication by cleartext constants (without multiplications), the communication cost is low. In addition, since the federated learning system according to the fourth example embodiment uses the N-out-of-N additive secret sharing of which the replication is 1, the federated learning system has a high security against collusion attacks.

Fifth Example Embodiment

Next, a federated learning system, federated learning server apparatuses, and federated learning client apparatuses according to a fifth example embodiment will be described with reference to FIGS. 14 to 16.

Figure 14:
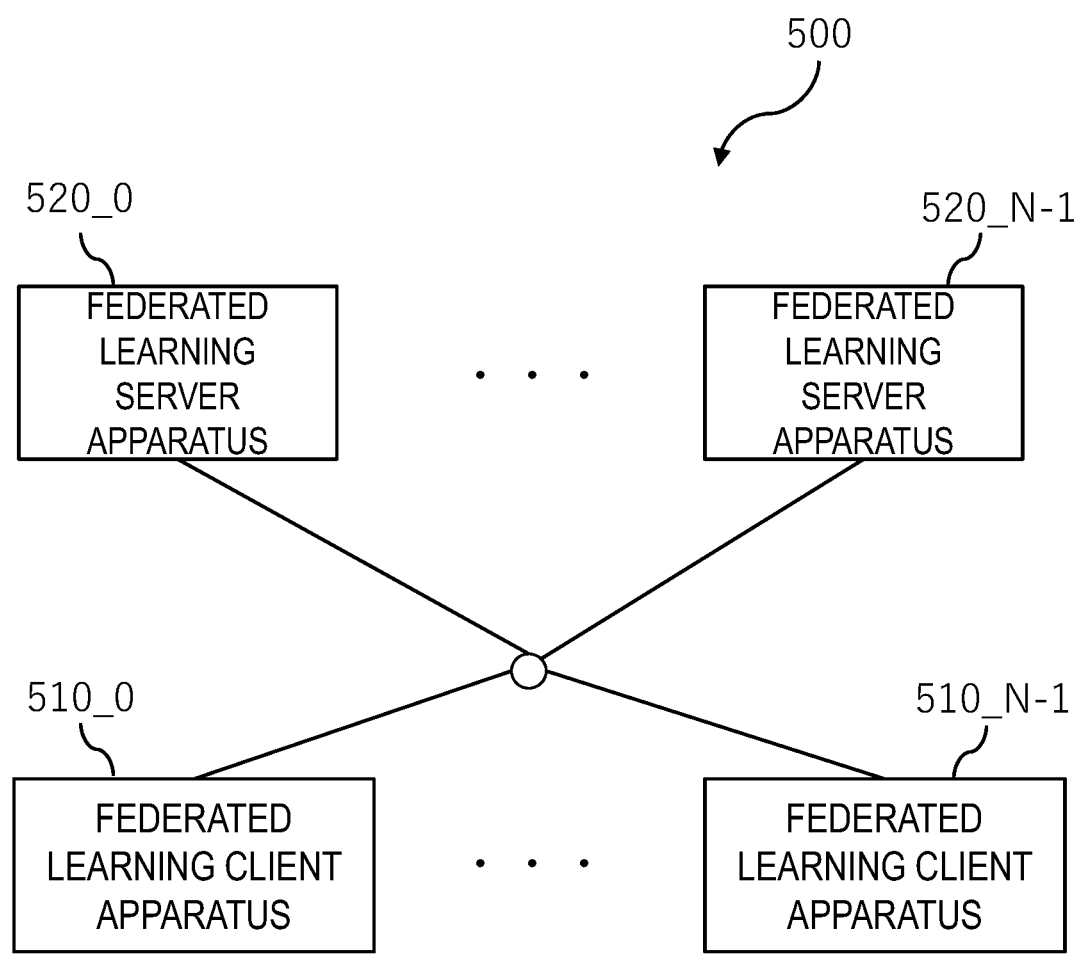
FIG. 14 is a block diagram illustrating a functional configuration example of a federated learning system according to a fifth example embodiment.

FIG. 14 is a block diagram illustrating a functional configuration example of the federated learning system according to the fifth example embodiment. As illustrated in FIG. 14, a federated learning system 500 according to the fifth example embodiment includes first to Nth federated learning client apparatuses 510_*i* (i=0, 1, . . . , N−1) and first to Nth federated learning server apparatuses 520_*i* (i=0, 1, . . . , N−1). The first to Nth federated learning client apparatuses 510_*i* (i=0, 1, . . . , N−1) and the first to Nth federated learning server apparatuses 520_*i* (i=0, 1, . . . , N−1) are connected to each other via a network such that these apparatuses can communicate with each other. N is a natural number of 3 or more.

The first to Nth federated learning client apparatuses 510_*i* (i=0, 1, . . . , N−1) are each operated by an independent organization (user). In addition, the first to Nth federated learning client apparatuses 510_*i* (i=0, 1, . . . , N−1) store data that their respective organizations do not wish to disclose to the outside. Although the organizations do not wish to disclose their own data to the outside, these organizations wish to mutually utilize their data and to perform machine learning on a shared model. In addition, the first to Nth federated learning server apparatuses $520\_i$ (i=0, 1, . . . , N−1) are each operated by an independent organization (user).

That is, the federated learning system 500 according to the fifth example embodiment is a server-client federated learning system. More specifically, as will be described below, the federated learning system 500 according to the fifth example embodiment is a federated learning system obtained by dividing the apparatuses included in the federated learning system 200 according to the second example embodiment into a group of apparatuses serving as servers and a group of apparatuses serving as clients. Thus, although the first to Nth federated learning client apparatuses $510\_i$ (i=0, 1, . . . , N−1) and the first to Nth federated learning server apparatuses $520\_i$ (i=0, 1, . . . , N−1) are distinguished from each other for convenience of description, these apparatuses can adopt the same hardware configuration. If the same hardware configuration is adopted, for example, a program that limits one or more functions may be executed.

Figure 15:
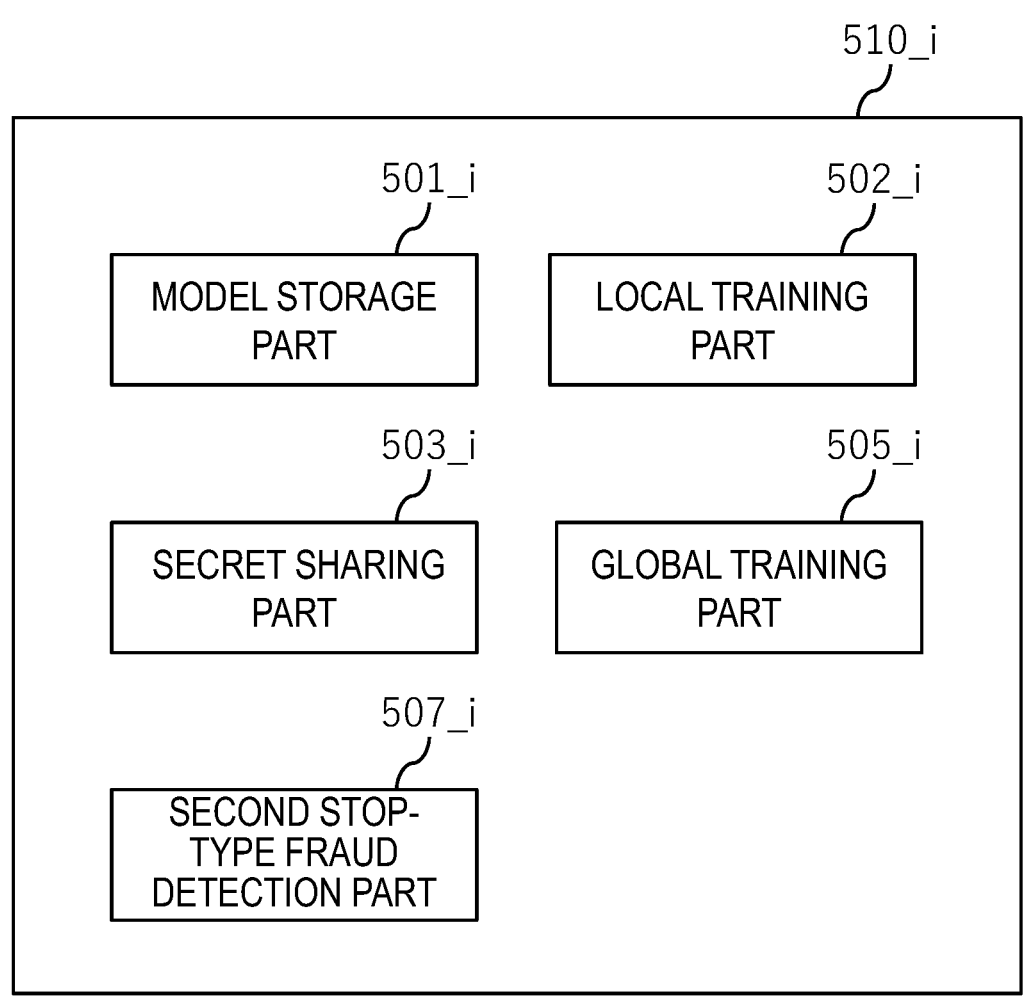
FIG. 15 is a block diagram illustrating a functional configuration example of a federated learning client apparatus according to the fifth example embodiment.
Figure 16:
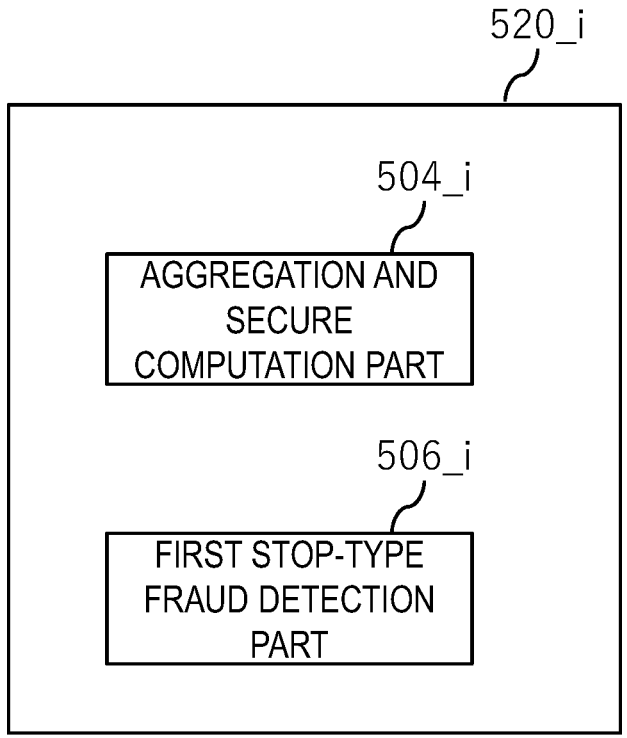
FIG. 16 is a block diagram illustrating a functional configuration example of a federated learning server apparatus according to the fifth example embodiment.

FIG. 15 is a block diagram illustrating a functional configuration example of a federated learning client apparatus according to the fifth example embodiment. As illustrated in FIG. 15, each of the first to Nth federated learning client apparatuses $510\_i$ (i=0, 1, . . . , N−1) includes a model storage part $501\_i$, a local training part $502\_i$, a secret sharing part $503\_i$, a global training part $505\_i$, and a second stop-type fraud detection part $507\_i$. FIG. 16 is a block diagram illustrating a functional configuration example of a federated learning server apparatus according to the fifth example embodiment. As illustrated in FIG. 16, each of the first to Nth federated learning server apparatuses $520\_i$ (i=0, 1, . . . , N−1) includes an aggregation and secure computation part $504\_i$ and a first stop-type fraud detection part $506\_i$.

The model storage part $501\_i$ of each of the first to Nth federated learning client apparatuses $510\_i$ (i=0, 1, . . . , N−1) is a storage device for replicating and storing a shared model, which is the target of the federated learning, as a local model. In addition, the local training part $502\_i$ is a processing part for training the local model by using data held by the individual one of the first to Nth federated learning client apparatuses $510\_i$ (i=0, 1, . . . , N−1).

The secret sharing part $503\_i$ of each of the first to Nth federated learning client apparatuses $510\_i$ (i=0, 1, . . . , N−1) is a processing part for decomposing a local update parameter indicating the training result of the local model to shares based on an additive secret sharing scheme and for transmitting the shares to the first to Nth federated learning server apparatuses $520\_i$ (i=0, 1, . . . , N−1).

The additive secret sharing scheme used in the fifth example embodiment is (N−t)-out-of-N replicated secret sharing. That is, the secret sharing part $503\_i$ decomposes the local update parameter indicating the training result of the local model into a sum on a residue class ring $Z_L$ of modulo L and transmits the values obtained by the decomposition to the first to Nth federated learning server apparatuses $520\_i$ (i=0, 1, . . . , N−1) such that the replication is t+1.

The first stop-type fraud detection part $506\_i$ of each of the first to Nth federated learning server apparatuses $520\_i$ (i=0, 1, . . . , N−1) is a processing part that requests the other federated learning server apparatuses to transmit the shares of their local update parameters and stops the processing if the shares of the local update parameters transmitted in response to the request do not match.

As described above, in the (N−t)-out-of-N replicated secret sharing, t+1 participants hold replications of the same sub-shares. Thus, even if t participants collude with each other and falsify a value, it is impossible to falsify all the sub-shares to the same values. Thus, the first stop-type fraud detection part $506\_i$ requests other t federated learning server apparatuses $520\_i$, which are supposed to hold replications of the same sub-shares as its own sub-shares, to transmit the shares of their local update parameters. If the shares of the local update parameters transmitted in response to the request do not match, the first stop-type fraud detection part $506\_i$ determines that there is a dishonest participant and stops the processing.

In contrast, if the shares of the local update parameters transmitted in response to the request match, the first stop-type fraud detection part $506\_i$ continues the processing and adopts the shares as the accurate shares of the local update parameters. When whether the shares of the local update parameters match is determined, the other federated learning server apparatuses $520\_i$ may first convert the shares into hash values by using a hash function and may next transmit the hash values to the first stop-type fraud detection part $506\_i$, instead of directly transmitting the shares. By transmitting the hash values, the communication amount can be reduced.

The aggregation and secure computation part $504\_i$ of each of the first to Nth federated learning server apparatuses $520\_i$ (i=0, 1, . . . , N−1) performs a secure computation for shares of a global update parameter by performing addition of the shares of the local update parameters adopted as the accurate shares of the local update parameters by the first stop-type fraud detection part $506\_i$ and by performing multiplication of the shares by cleartext constants. Concretely, the aggregation and secure computation part $504\_i$ computes a weighted average of local update parameters $\Delta_i$ (i=0, 1, . . . , N−1) weighted by data volumes $V_i$ (i=0, 1, . . . , N−1) by performing addition of the shares of the local update parameters and multiplication of the shares by cleartext constants.

The second stop-type fraud detection part $507\_i$ of each of the first to Nth federated learning client apparatuses $510\_i$ (i=0, 1, . . . , N−1) is a processing part that stops the processing if the shares of the global update parameter received to reconstruct the global update parameter do not match. The second stop-type fraud detection part $507\_i$ requests other t+1 federated learning server apparatuses $520\_i$ (i=0, 1, . . . , N−1), which are supposed to hold replications of the same sub-shares of the global update parameter, to transmit the shares of their global update parameter. If the shares of the global update parameter transmitted in response to the request do not match, the second stop-type fraud detection part $507\_i$ determines there is a dishonest participant and stops the processing. In contrast, if the shares of the global update parameter transmitted in response to the request match, the second stop-type fraud detection part $507\_i$ adopts the shares as the accurate shares of the global update parameter.

When whether the shares of the global update parameter match is determined, the t+1 other federated learning server apparatuses $520\_i$ may first convert the shares into hash values by using a hash function and may next transmit the hash values to the second stop-type fraud detection part $507\_i$, instead of directly transmitting the shares. By transmitting the hash values, the communication amount can be reduced.

The global training part 505_*i* of each of the first to Nth federated learning client apparatuses 510_*i* (i=0, 1, . . . , N−1) is a processing part that reconstructs the shares of the global update parameter and that updates the shared model by the global update parameter. The global training part 505_*i* reconstructs the global update parameter by using the shares adopted as the accurate shares of the global update parameter by the second stop-type fraud detection part 507_*i*. Next, the global training part 505_*i* trains the shared model by applying the reconstructed global update parameter to the shared model, which is the target of the federated learning.

As described above, in the federated learning system according to the fifth example embodiment, since the first to Nth federated learning client apparatuses 510_*i* (i=0, 1, . . . , N−1) and the first to Nth federated learning server apparatuses 520_*i* (i=0, 1, . . . , N−1) have their respective configurations described above, it is possible to perform the federated learning while concealing the local update parameters. In the federated learning system according to the fifth example embodiment, since the processing can be performed only by performing a secure computation with addition and multiplication by cleartext constants (without multiplications), the communication cost is low. In addition, since the federated learning system according to the fifth example embodiment uses the (N−t)-out-of-N replicated secret sharing of which the replication is t+1, even if t participants collude with each other and falsify a value, the federated learning system can detect the falsification and stop the processing.

Method

Figure 17:
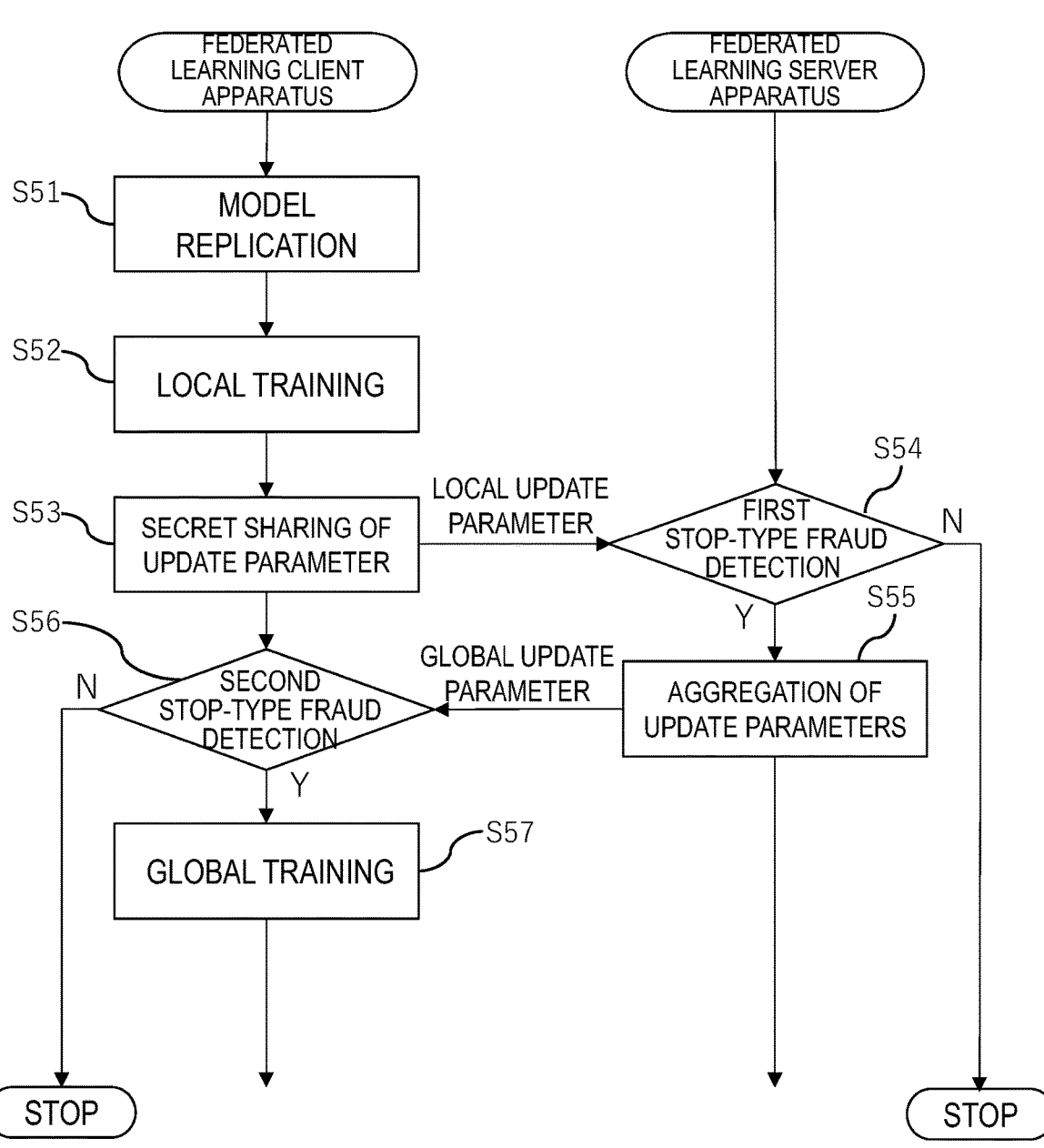
FIG. 17 is a system flowchart illustrating an outline of a procedure of a federated learning method according to the fifth example embodiment.

Next, a federated learning method according to the fifth example embodiment will be described. FIG. 17 is a system flowchart illustrating an outline of a procedure of the federated learning method according to the fifth example embodiment.

As illustrated in FIG. 17, the federated learning method according to the fifth example embodiment includes the processing performed by the first to Nth federated learning client apparatuses 510_*i* (i=0, 1, . . . , N−1) and the processing performed by the first to Nth federated learning server apparatuses 520_*i* (i=0, 1, . . . , N−1). The processing performed by the first to Nth federated learning client apparatuses 510_*i* (i=0, 1, . . . , N−1) includes a model replication step (S51), a local training step (S52), an update parameter secret sharing step (S53), a second stop-type fraud detection step (S56), and a global training step (S57). The processing performed by the first to Nth federated learning server apparatuses 520_*i* (i=0, 1, . . . , N−1) includes a first stop-type fraud detection step (S54) and an update parameter aggregation step (S55).

In the model replication step (S51), each of the first to Nth federated learning client apparatuses 510_*i* (i=0, 1, . . . , N−1) replicates and stores a shared model, which is the target of the federated learning, as a local model. Next, in the local training step (S52), each of the first to Nth federated learning client apparatuses 510_*i* (i=0, 1, . . . , N−1) trains the local model by using the data held thereby.

In the update parameter secret sharing step (S53), each of the first to Nth federated learning client apparatuses 510_*i* (i=0, 1, . . . , N−1) decomposes a local update parameter obtained in the local training step (S52) to shares based on an additive secret sharing scheme and transmits the shares to the first to Nth federated learning server apparatuses 520_*i* (i=0, 1, . . . , N−1). In this step, the above (N−t)-out-of-N replicated secret sharing is used as the additive secret sharing scheme. That is, the replication of the additive secret sharing scheme according to the fifth example embodiment is t+1.

In the first stop-type fraud detection step (S54), each of the first to Nth federated learning server apparatuses 520_*i* (i=0, 1, . . . , N−1) requests the other federated learning server apparatuses to transmit the shares of their local update parameters. If the shares of the local update parameters transmitted in response to the request do not match (S54; N), the first stop-type fraud detection part 506_*i* determines that there is a dishonest participant and stops the processing. In contrast, if the shares of the local update parameters transmitted in response to the request match (S54; Y), the first stop-type fraud detection part 506_*i* continues the processing and adopts the shares as the accurate shares of the local update parameters.

In the update parameter aggregation step (S55), each of the first to Nth federated learning server apparatuses 520_*i* (i=0, 1, . . . , N−1) performs a secure computation for shares of a global update parameter by performing addition of the shares of the local update parameters adopted as the accurate shares of the local update parameters in the first stop-type fraud detection step (S54) and by performing multiplication of the shares by cleartext constants. In the update parameter aggregation step (S55), the aggregation and secure computation part 504_*i* computes a weighted average of local update parameters $\Delta_i$ (i=0, 1, . . . , N−1) weighted by data volumes $V_i$ (i=0, 1, . . . , N−1) by performing addition of the shares of the local update parameters and multiplication of the shares by cleartext constants.

In the second stop-type fraud detection step (S56), each of the first to Nth federated learning client apparatuses 510_*i* (i=0, 1, . . . , N−1) stops the processing if the shares of the global update parameter received to reconstruct the global update parameter do not match. In the second stop-type fraud detection step (S56), the second stop-type fraud detection part 507_*i* requests t+1 federated learning server apparatuses 520_*i*, which are supposed to hold replications of the same sub-shares of the global update parameter, to transmit the shares of the global update parameter. If the shares of the global update parameter transmitted in response to the request do not match (S56; N), the second stop-type fraud detection part 507_*i* determines that there is a dishonest participant and stops the processing. In contrast, if the shares of the global update parameter transmitted in response to the request match (S56; Y), the second stop-type fraud detection part 507_*i* adopts the shares as the accurate shares of the global update parameter.

In the global training step (S57), each of the first to Nth federated learning client apparatuses 510_*i* (i=0, 1, . . . , N−1) reconstructs the shares of the global update parameter and updates the shared model by the global update parameter. Each of the first to Nth federated learning client apparatuses 510_*i* (i=0, 1, . . . , N−1) reconstructs the global update parameter by using the shares adopted as the accurate shares of the global update parameter in the second stop-type fraud detection step (S56). Next, each of the first to Nth federated learning client apparatuses 510_*i* (i=0, 1, . . . , N−1) trains the shared model by applying the reconstructed global update parameter to the shared model, which is the target of the federated learning.

As described above, in the federated learning method according to the fifth example embodiment, the first to Nth federated learning client apparatuses 510_*i* (i=0, 1, . . . , N−1) and the first to Nth federated learning server apparatuses 520_*i* (i=0, 1, . . . , N−1) can perform the federated learning while concealing the local update parameters by coordinating with each other. In the federated learning system according to the fifth example embodiment, since the processing can be performed only by performing a secure computation with addition and multiplication by cleartext constants (without multiplications), the communication cost is low. In addition, since the federated learning system according to the fifth example embodiment uses the (N−t)-out-of-N replicated secret sharing of which the replication is t+1, even if t participants collude with each other and falsify a value, the federated learning system can detect the falsification and stop the processing.

Sixth Example Embodiment

Next, a federated learning system, federated learning server apparatuses, and federated learning client apparatuses according to a sixth example embodiment will be described with reference to FIGS. 18 to 20.

Figure 18:
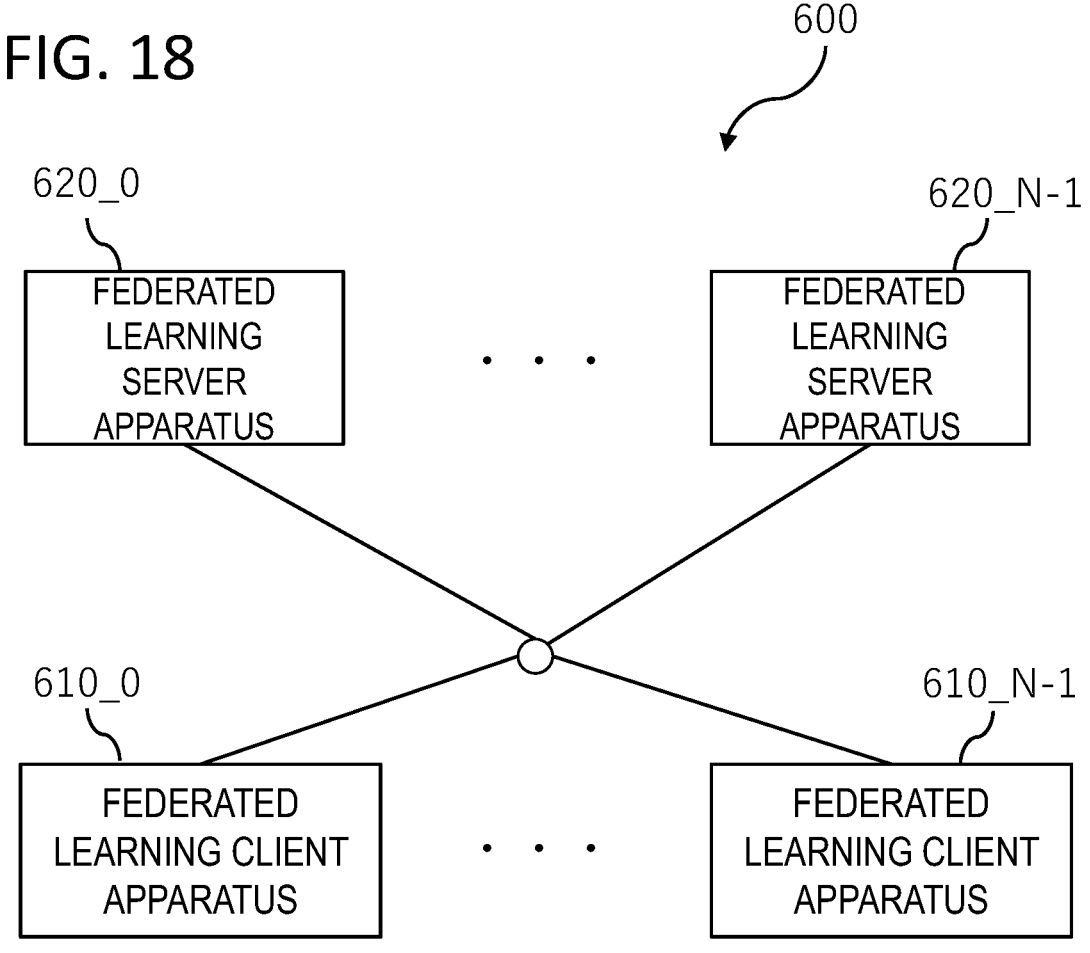
FIG. 18 is a block diagram illustrating a functional configuration example of a federated learning system according to a sixth example embodiment.

FIG. 18 is a block diagram illustrating a functional configuration example of the federated learning system according to the sixth example embodiment. As illustrated in FIG. 18, a federated learning system 600 according to the sixth example embodiment includes first to Nth federated learning client apparatuses 610_i (i=0, 1, . . . , N−1) and first to Nth federated learning server apparatuses 620_i (i=0, 1, . . . , N−1). The first to Nth federated learning client apparatuses 610_i (i=0, 1, . . . , N−1) and the first to Nth federated learning server apparatuses 620_i (i=0, 1, . . . , N−1) are connected to each other via a network such that these apparatuses can communicate with each other. N is a natural number of 4 or more.

The first to Nth federated learning client apparatuses 610_i (i=0, 1, . . . , N−1) are each operated by an independent organization (user). In addition, the first to Nth federated learning client apparatuses 610_i (i=0, 1, . . . , N−1) store data that their respective organizations do not wish to disclose to the outside. Although the organizations do not wish to disclose their own data to the outside, these organizations wish to mutually utilize their data and to perform machine learning on a shared model. In addition, the first to Nth federated learning server apparatuses 620_i (i=0, 1, . . . , N−1) are each operated by an independent organization (user).

That is, the federated learning system 600 according to the sixth example embodiment is a server-client federated learning system. More specifically, as will be described below, the federated learning system 600 according to the sixth example embodiment is a federated learning system obtained by dividing the apparatuses included in the federated learning system 300 according to the third example embodiment into a group of apparatuses serving as servers and a group of apparatuses serving as clients. Thus, although the first to Nth federated learning client apparatuses 610_i (i=0, 1, . . . , N−1) and the first to Nth federated learning server apparatuses 620_i (i=0, 1, . . . , N−1) are distinguished from each other for convenience of description, these apparatuses can adopt the same hardware configuration. If the same hardware configuration is adopted, for example, a program that limits one or more functions may be executed.

Figure 19:
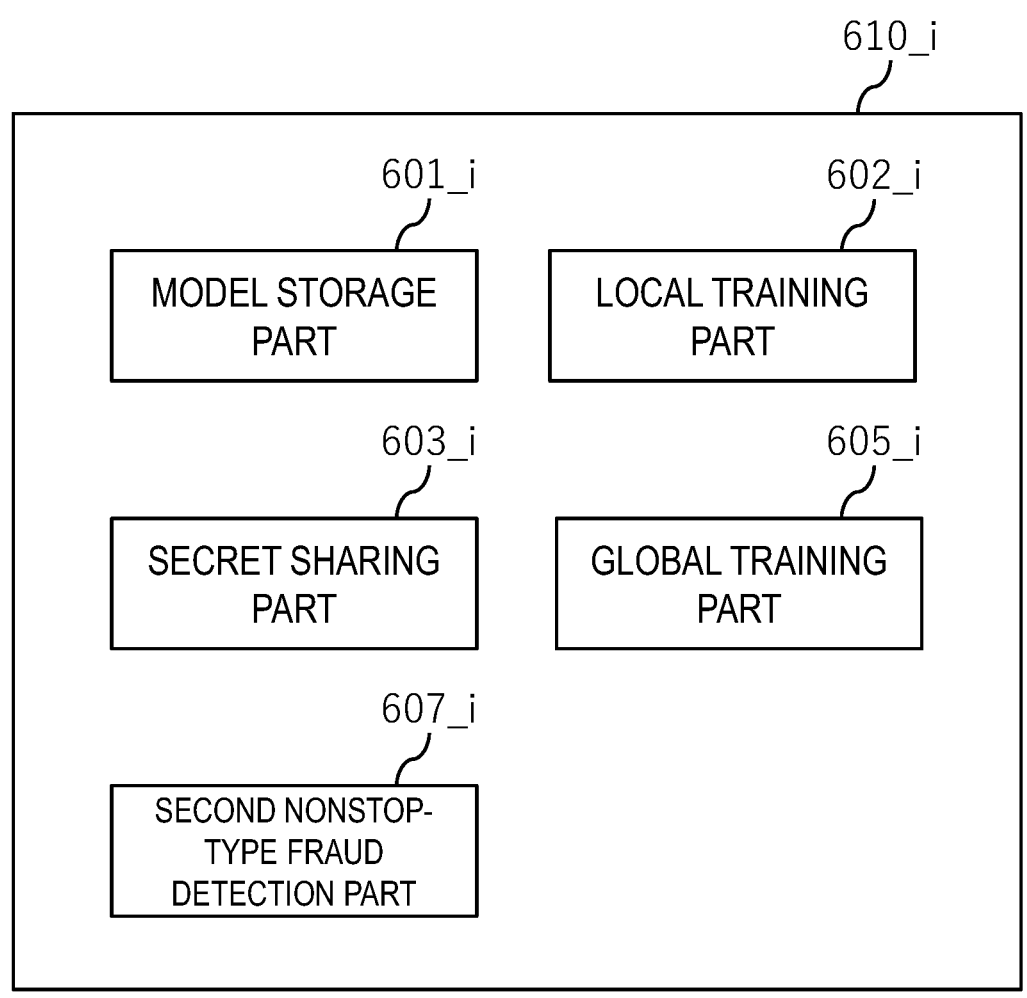
FIG. 19 is a block diagram illustrating a functional configuration example of a federated learning client apparatus according to the sixth example embodiment.
Figure 20:
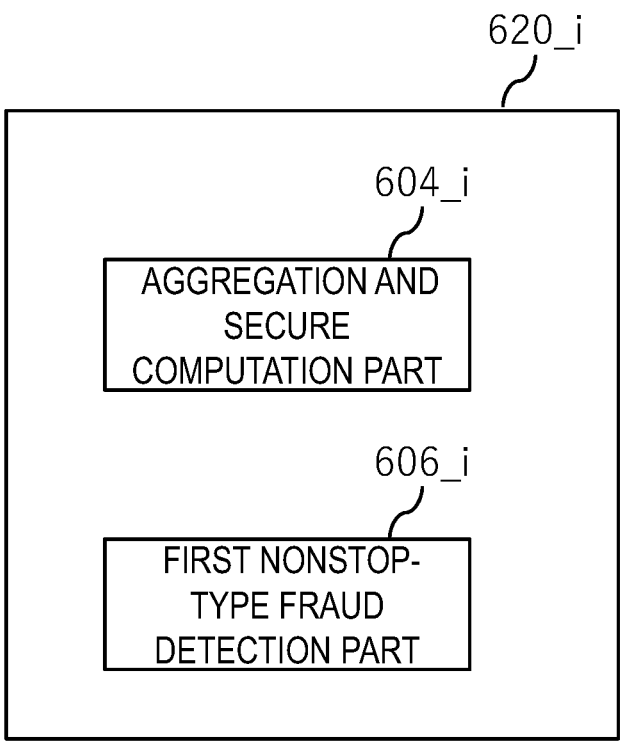
FIG. 20 is a block diagram illustrating a functional configuration example of a federated learning server apparatus according to the sixth example embodiment.

FIG. 19 is a block diagram illustrating a functional configuration example of a federated learning client apparatus according to the sixth example embodiment. As illustrated in FIG. 19, each of the first to Nth federated learning client apparatuses 610_i (i=0, 1, . . . , N−1) includes a model storage part 601_i, a local training part 602_i, a secret sharing part 603_i, a global training part 605_i, and a second nonstop-type fraud detection part 607_i. FIG. 20 is a block diagram illustrating a functional configuration example of a federated learning server apparatus according to the sixth example embodiment. As illustrated in FIG. 20, each of the first to Nth federated learning server apparatuses 620_i (i=0, 1, . . . , N−1) includes an aggregation and secure computation part 604_i and a first nonstop-type fraud detection part 606_i.

The model storage part 601_i of each of the first to Nth federated learning client apparatuses 610_i (i=0, 1, . . . , N−1) is a storage device for replicating and storing a shared model, which is the target of the federated learning, as a local model. In addition, the local training part 602_i is a processing part for training the local model by using data held by the individual one of the first to Nth client apparatuses 610_i (i=0, 1, . . . , N−1).

The secret sharing part 603_i of each of the first to Nth federated learning client apparatuses 610_i (i=0, 1, . . . , N−1) is a processing part for decomposing a local update parameter indicating the training result of the local model to shares based on an additive secret sharing scheme and for transmitting the shares to the federated learning server apparatuses 620_i (i=0, 1, . . . , N−1).

The additive secret sharing scheme used in the sixth example embodiment is (N−2t)-out-of-N replicated secret sharing. That is, the secret sharing part 603_i decomposes the local update parameter indicating the training result of the local model into a sum on a residue class ring $Z_L$ of modulo L and transmits the values obtained by the decomposition to the first to Nth federated learning server apparatuses 620_i (i=0, 1, . . . , N−1) such that the replication is 2t+1.

The first nonstop-type fraud detection part 606_i of each of the first to Nth federated learning server apparatuses 620_i (i=0, 1, . . . , N−1) is a processing part that requests transmission of the shares of the local update parameters and adopts, of all the shares of the local update parameters transmitted in response to the request, a majority of shares that match, as the accurate shares of the local update parameters.

As described above, in the (N−2t)-out-of-N replicated secret sharing, 2t+1 participants hold replications of the same sub-shares. Thus, even if t participants collude with each other and falsify a value, it is impossible to falsify all the sub-shares to the same values. Thus, t+1 participants hold accurate values. That is, a majority of the values are accurate values. The first nonstop-type fraud detection part 606_i requests other 2t federated learning server apparatuses 620_i, which are supposed to hold replications of the same sub-shares as its own sub-shares, to transmit the shares of their local update parameters and adopts, of all the shares of the local update parameters transmitted in response to the request, a majority of shares that match, as accurate values.

If some of the first to Nth federated learning client apparatuses 610_i (i=0, 1, . . . , N−1) that provide local update parameters are operated by attackers and if falsification has already been made at the time when these federated learning client apparatuses 610_i have distributed their local update parameters in a secret sharing manner, a majority of shares of the local update parameters could not match. In this case, the first nonstop-type fraud detection part 606_i does not adopt these local update parameters and continues the processing by recognizing the parameters as if the parameters were not present.

When whether the shares of the local update parameters match is determined, the first to Nth federated learning client apparatuses 610_i (i=0, 1, . . . , N−1) may first convert the shares into hash values by using a hash function and may next transmit the hash values to the first to Nth federated learning server apparatuses 620_i (i=0, 1, . . . , N−1), instead of directly transmitting the shares. By transmitting the hash values, the communication amount can be reduced.

The aggregation and secure computation part 604_i of each of the first to Nth federated learning server apparatuses 620_i (i=0, 1, . . . , N−1) performs a secure computation for shares of a global update parameter by performing addition of the shares of the local update parameters adopted as the accurate shares of the local update parameters by the first nonstop-type fraud detection part 606_i and by performing multiplication of the shares by cleartext constants. Concretely, the aggregation and secure computation part 604_i computes a weighted average of local update parameters $\Delta_i$ (i=0, 1, . . . , N−1) weighted by data volumes $V_i$ (i=0, 1, . . . , N−1) by performing addition of the shares of the local update parameters and multiplication of the shares by cleartext constants.

The second nonstop-type fraud detection part 607_i of each of the first to Nth federated learning client apparatuses 610_i (i=0, 1, . . . , N−1) adopts, of all the shares of the global update parameter received to reconstruct the global update parameter, a majority of shares that match, as the accurate shares of the global update parameter. The second nonstop-type fraud detection part 607_i requests 2t+1 federated learning server apparatuses 620_i, which are supposed to hold replications of the same sub-shares of the global update parameter, to transmit the shares of their global update parameter, and adopts, of all the shares of the global update parameter transmitted in response to the request, a majority of shares that match, as accurate values.

When whether the shares of the global update parameter match is determined, the 2t+1 federated learning server apparatuses 620_i may first convert the shares into hash values by using a hash function and may next transmit the hash values to the second nonstop-type fraud detection part 607_i, instead of directly transmitting the shares. By transmitting the hash values, the communication amount can be reduced.

The global training part 605_i of each of the first to Nth federated learning client apparatuses 610_i (i=0, 1, . . . , N−1) is a processing part that reconstructs the shares of the global update parameter and that updates the shared model by the global update parameter. The global training part 605_i reconstructs the global update parameter by using the shares adopted as the accurate shares of the global update parameter by the second nonstop-type fraud detection part 607_i. Next, the global training part 605_i trains the shared model by applying the reconstructed global update parameter to the shared model, which is the target of the federated learning.

As described above, in the federated learning system according to the sixth example embodiment, since the first to Nth federated learning client apparatuses 610_i (i=0, 1, . . . , N−1) and the first to Nth federated learning server apparatuses 620_i (i=0, 1, . . . , N−1) have their respective configurations described above, it is possible to perform the federated learning while concealing the local update parameters. In the federated learning system according to the sixth example embodiment, since the processing can be performed only by performing a secure computation with addition and multiplication by cleartext constants (without multiplications), the communication cost is low. In addition, since the federated learning system according to the sixth example embodiment uses the (N−2t)-out-of-N replicated secret sharing of which the replication is 2t+1, even if t participants collude with each other and falsify a value, the federated learning system can continue the processing by selecting the accurate values.

Method

Figure 21:
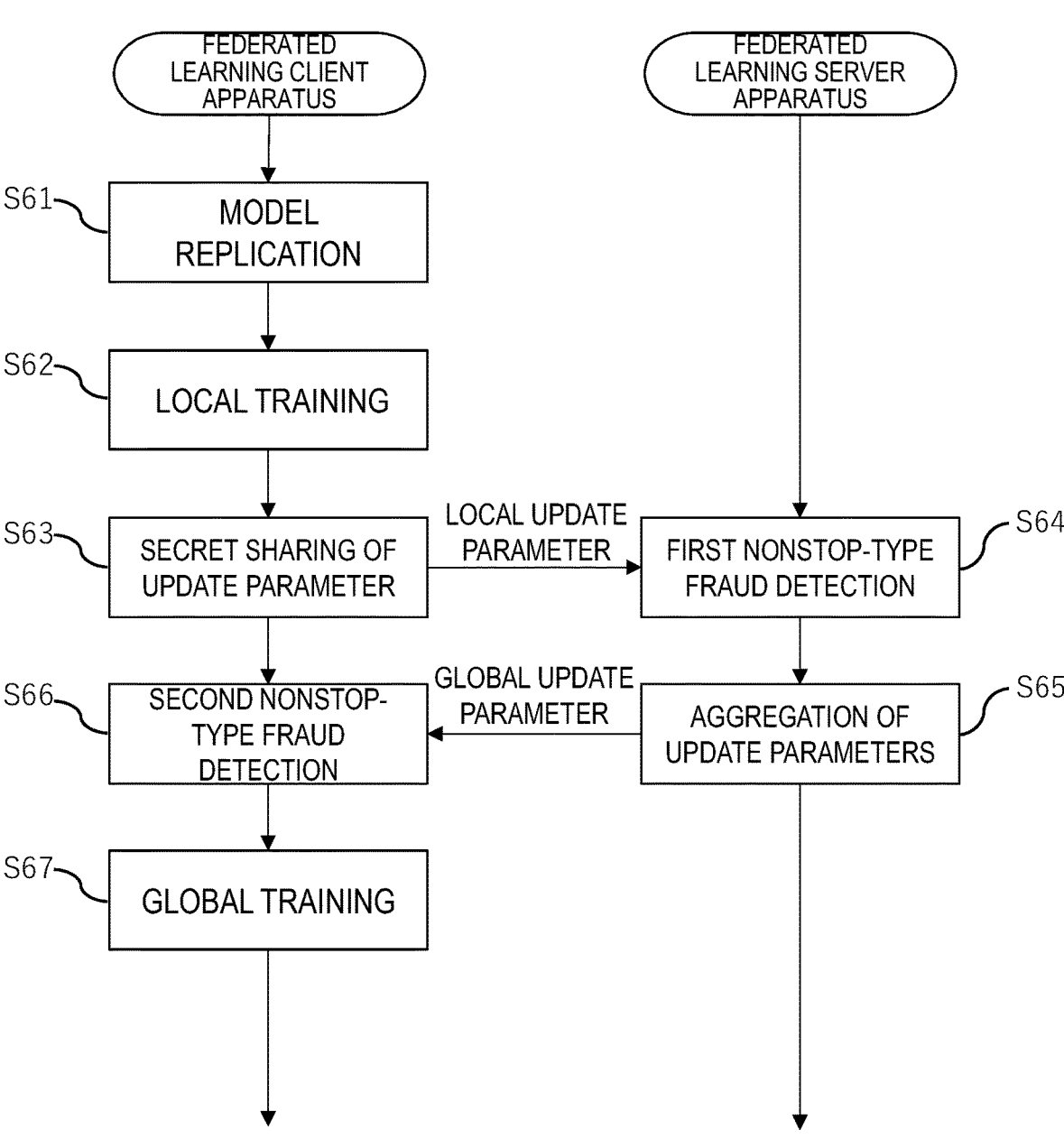
FIG. 21 is a system flowchart illustrating an outline of a procedure of a federated learning method according to the sixth example embodiment.

Next, a federated learning method according to the sixth example embodiment will be described. FIG. 21 is a system flowchart illustrating an outline of a procedure of the federated learning method according to the sixth example embodiment.

As illustrated in FIG. 21, the federated learning method according to the sixth example embodiment includes the processing performed by the first to Nth federated learning client apparatuses 610_i (i=0, 1, . . . , N−1) and the processing performed by the first to Nth federated learning server apparatuses 620_i (i=0, 1, . . . , N−1). The processing performed by each of the first to Nth federated learning client apparatuses 610_i (i=0, 1, . . . , N−1) includes a model replication step (S61), a local training step (S62), an update parameter secret sharing step (S63), a second nonstop-type fraud detection step (S66), and a global training step (S67). The processing performed by each of the first to Nth federated learning server apparatuses 620_i (i=0, 1, . . . , N−1) includes a first nonstop-type fraud detection step (S64) and an update parameter aggregation step (S65).

In the model replication step (S61), each of the first to Nth federated learning client apparatuses 610_i (i=0, 1, . . . , N−1) replicates and stores a shared model, which is the target of the federated learning, as a local model. Next, in the local training step (S62), each of the first to Nth federated learning client apparatuses 610_i (i=0, 1, . . . , N−1) trains the local model by using the data held thereby.

In the update parameter secret sharing step (S63), each of the first to Nth federated learning client apparatuses 610_i (i=0, 1, . . . , N−1) decomposes a local update parameter obtained in the local training step (S62) to shares based on an additive secret sharing scheme and transmits the shares to the first to Nth federated learning server apparatuses 620_i (i=0, 1, . . . , N−1). In this step, the above-described (N−2t)-out-of-N replicated secret sharing is used as the additive secret sharing scheme. That is, the replication of the additive secret sharing scheme according to the sixth example embodiment is 2t+1.

In the (N−2t)-out-of-N replicated secret sharing, 2t+1 participants hold replications of the same sub-shares. Thus, even if t participants collude with each other and falsify a value, it is impossible to falsify all the sub-shares to the same values. In other words, t+1 participants hold the accurate values. That is, a majority of the values are accurate values. In the first nonstop-type fraud detection step (S64), the second nonstop-type fraud detection part 607_i requests other 2t federated learning server apparatuses 620_i, which are supposed to hold replications of the same sub-shares as its own sub-shares, to transmit the shares of their local update parameters, and adopts, of all the shares of the local update parameters transmitted in response to the request, a majority of shares that match, as accurate values.

In the update parameter aggregation step (S65), each of the first to Nth federated learning server apparatuses 620_i (i=0, 1, . . . , N−1) performs a secure computation for shares of a global update parameter by performing addition of the shares of the local update parameters adopted as the accurate shares of the local update parameters in the first nonstop-type fraud detection step (S64) and by performing multiplication of the shares by cleartext constants. In the update parameter aggregation step (S65), each of the first to Nth federated learning server apparatuses $620\_i$ (i=0, 1, . . . , N−1) computes a weighted average of the local update parameters $\Delta_i$ (i=0, 1, . . . , N−1) weighted by the data volumes $V_i$ (i=0, 1, . . . , N−1) by performing addition of the shares of the local update parameters and multiplication of the shares by cleartext constants.

In the second nonstop-type fraud detection step (S66), each of the first to Nth federated learning client apparatuses $610\_i$ (i=0, 1, . . . , N−1) adopts, of all the shares of the global update parameter received to reconstruct the global update parameter, a majority of shares that match, as the accurate shares of the global update parameter. In the second nonstop-type fraud detection step (S66), the second nonstop-type fraud detection part $607\_i$ requests 2t+1 federated learning server apparatuses $620\_i$, which are supposed to hold replications of the same sub-shares of the global update parameter, to transmit the shares of their global update parameter, and adopts, of all the shares of the global update parameter transmitted in response to the request, a majority of shares that match, as the accurate shares of the global update parameter.

In the global training step (S67), each of the first to Nth federated learning client apparatuses $610\_i$ (i=0, 1, . . . , N−1) reconstructs the shares of the global update parameter and updates the shared model by the global update parameter. Each of the first to Nth federated learning client apparatuses $610\_i$ (i=0, 1, . . . , N−1) reconstructs the global update parameter by using the shares adopted as the accurate shares of the global update parameter in the second nonstop-type fraud detection step (S66). Next, each of the first to Nth federated learning client apparatuses $610\_i$ (i=0, 1, . . . , N−1) trains the shared model by applying the reconstructed global update parameter to the shared model, which is the target of the federated learning.

As described above, in the federated learning method according to the sixth example embodiment, the first to Nth federated learning client apparatuses $610\_i$ (i=0, 1, . . . , N−1) and the first to Nth federated learning server apparatuses $620\_i$ (i=0, 1, . . . , N−1) can perform the federated learning while concealing the local update parameters by coordinating with each other. In the federated learning system according to the sixth example embodiment, since the processing can be performed only by performing a secure computation with addition and multiplication by cleartext constants (without multiplications), the communication cost is low. In addition, since the federated learning system according to the sixth example embodiment uses the (N−2t)-out-of-N replicated secret sharing of which the replication is 2t+1, even if t participants collude with each other and falsify a value, the federated learning system can continue the processing by selecting the accurate values.

Hardware Configuration Example

Figure 22:
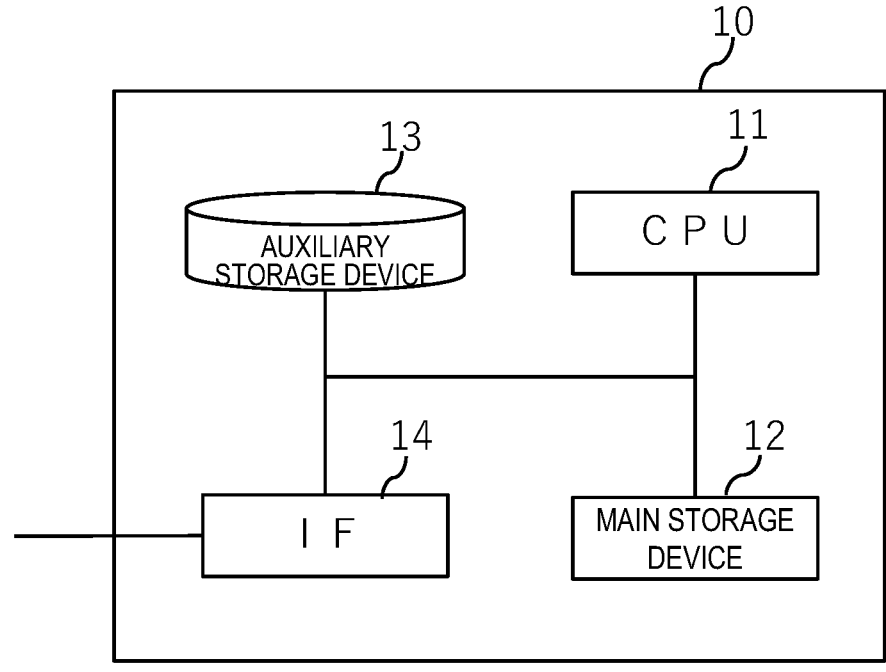
FIG. 22 is a diagram illustrating a hardware configuration example of a federated learning apparatus.

FIG. 22 is a diagram illustrating a hardware configuration example of a federated learning apparatus. That is, the hardware configuration example illustrated in FIG. 22 is a hardware configuration example of any one of the federated learning apparatuses $100\_i$, $200\_i$, and $300\_i$, the federated learning client apparatuses $410\_i$, $510\_i$, and $610\_i$, and the federated learning server apparatuses $420\_i$, $520\_i$, and $620\_i$ (i=0, 1, . . . , N−1). An information processing apparatus (a computer) that adopts the hardware configuration illustrated in FIG. 22 can realize the individual functions of any one of the federated learning apparatuses $100\_i$, $200\_i$, and $300\_i$, the federated learning client apparatuses $410\_i$, $510\_i$, and $610\_i$, and the federated learning server apparatuses $420\_i$, $520\_i$, and $620\_i$ (i=0, 1, . . . , N−1) by executing the corresponding one of the above secure computation methods as a program.

The hardware configuration example illustrated in FIG. 22 is an example of the hardware configuration that realizes the individual functions of any one of the federated learning apparatuses $100\_i$, $200\_i$, and $300\_i$, the federated learning client apparatuses $410\_i$, $510\_i$, and $610\_i$, and the federated learning server apparatuses $420\_i$, $520\_i$, and $620\_i$ (i=0, 1, . . . , N−1), and does not limit the hardware configuration of any one of the federated learning apparatuses $100\_i$, $200\_i$, and $300\_i$, the federated learning client apparatuses $410\_i$, $510\_i$, and $610\_i$, and the federated learning server apparatuses $420\_i$, $520\_i$, and $620\_i$ (i=0, 1, . . . , N−1). The federated learning apparatuses $100\_i$, $200\_i$, and $300\_i$, the federated learning client apparatuses $410\_i$, $510\_i$, and $610\_i$, and the federated learning server apparatuses $420\_i$, $520\_i$, and $620\_i$ (i=0, 1, . . . , N−1) may include hardware not illustrated in FIG. 22.

As illustrated in FIG. 22, a hardware configuration 10 that can be adopted by any one of the federated learning apparatuses $100\_i$, $200\_i$, and $300\_i$, the federated learning client apparatuses $410\_i$, $510\_i$, and $610\_i$, and the federated learning server apparatuses $420\_i$, $520\_i$, and $620\_i$ (i=0, 1, . . . , N−1) includes, for example, a CPU (Central Processing Unit) 11, a main storage device 12, an auxiliary storage device 13, and an IF (Interface) part 14, which are connected to each other via an internal bus.

The CPU 11 executes various commands included in the federated learning program executed by the corresponding one of the federated learning apparatuses $100\_i$, $200\_i$, and $300\_i$, the federated learning client apparatuses $410\_i$, $510\_i$, and $610\_i$, and the federated learning server apparatuses $420\_i$, $520\_i$, and $620\_i$ (i=0, 1, . . . , N−1). The main storage device 12 is, for example, a RAM (Random Access Memory) and temporarily stores various kinds of programs such as the secure computation program executed by the corresponding one of the federated learning apparatuses $100\_i$, $200\_i$, and $300\_i$, the federated learning client apparatuses $410\_i$, $510\_i$, and $610\_i$, and the federated learning server apparatuses $420\_i$, $520\_i$, and $620\_i$ (i=0, 1, . . . , N−1) such that the CPU 11 can process these programs.

The auxiliary storage device 13 is, for example, an HDD (Hard Disk Drive) and can store, in the mid-to-long term, various kinds of programs such as the secure computation program executed by the corresponding one of the federated learning apparatuses $100\_i$, $200\_i$, and $300\_i$, the federated learning client apparatuses $410\_i$, $510\_i$, and $610\_i$, and the federated learning server apparatuses $420\_i$, $520\_i$, and $620\_i$ (i=0, 1, . . . , N−1). These various kinds of programs such as the secure computation program can be recorded in a non-transitory computer-readable storage medium and can be provided as a program product. The auxiliary storage device 13 can be used to store, in the mid-to-long term, various kinds of programs such as the secure computation program recorded in a non-transitory computer-readable storage medium. The IF part 14 provides an interface regarding the input and output among at least one of the federated learning apparatuses $100\_i$, $200\_i$, and $300\_i$, the federated learning client apparatuses $410\_i$, $510\_i$, and $610\_i$, and the federated learning server apparatuses $420\_i$, $520\_i$, and $620\_i$ (i=0, 1, . . . , N−1).

An information processing apparatus that adopts the hardware configuration 10 as described above realizes the functions of any one of the federated learning apparatuses $100\_i$, $200\_i$, and $300\_i$, the federated learning client apparatuses $410\_i$, $510\_i$, and $610\_i$, and the federated learning server apparatuses 420_*i*, 520_*i*, and 620_*i* (i=0, 1, . . . , N–1) by executing the corresponding one of the above-described federated learning methods as a program.

The above example embodiments can partially or entirely be described, but not limited to, as the following notes.

[Note 1]

A federated learning system, which includes at least two federated learning apparatuses connected to each other via a network so as to train a shared model, an individual one of the federated learning apparatuses comprising:

a model storage part that replicates and stores the shared model as a local model;

a local training part that trains the local model by using data held by the individual one of the federated learning apparatuses;

a secret sharing part that decomposes a local update parameter indicating a training result of the local model into shares based on an additive secret sharing scheme and distributes the shares to the other federated learning apparatuses;

an aggregation and secure computation part that performs a secure computation for shares of a global update parameter by performing addition of the shares of the local update parameters and multiplication of the shares by cleartext constants; and a global training part that reconstructs the shares of the global update parameter and updates the shared model by the global update parameter.

[Note 2]

The federated learning system according to note 1, comprising a first stop-type fraud detection part that requests the other federated learning apparatuses to transmit the shares of the local update parameters and stops processing if the shares of the local update parameters transmitted in response to the request do not match.

[Note 3]

The federated learning system according to note 1 or 2, comprising a second stop-type fraud detection part that stops processing if the shares of the global update parameter received when the reconstruction is performed do not match.

[Note 4]

The federated learning system according to note 1, comprising a first nonstop-type fraud detection part that requests the other federated learning apparatuses to transmit the shares of the local update parameters and adopts, of all the shares of the local update parameters transmitted in response to the request, a majority of shares that match, as accurate shares of the local update parameters.

[Note 5]

The federated learning system according to note 1 or 4, comprising a second nonstop-type fraud detection part that adopts, of all the shares of the global update parameter received when the reconstruction is performed, a majority of shares that match, as accurate shares of the global update parameters.

[Note 6]

A federated learning system, comprising federated learning server apparatuses and federated learning client apparatuses connected to each other via a network so as to train a shared model;

wherein an individual one of the federated learning client apparatuses includes:

a model storage part that replicates and stores the shared model as a local model;

a local training part that trains the local model by using data held by the individual one of the federated learning client apparatuses;

a secret sharing part that decomposes a local update parameter indicating a training result of the local model into shares based on an additive secret sharing scheme and transmits the shares to the federated learning server apparatuses; and a global training part that reconstructs shares of a global update parameter received from the federated learning server apparatuses and updates the shared model by the global update parameter; and wherein the individual one of the federated learning server apparatuses includes an aggregation and secure computation part that performs a secure computation for the shares of the global update parameter by performing addition of the shares of the local update parameters and multiplication of the shares by cleartext constants and that transmits the shares of the global update parameter to the federated learning client apparatuses.

[Note 7]

The federated learning system according to note 6; wherein the individual one of the federated learning server apparatuses includes a first stop-type fraud detection part that requests the other federated learning server apparatuses to transmit the shares of the local update parameters and stops processing if the local update parameters transmitted in response to the request do not match.

[Note 8]

The federated learning system according to note 6 or 7; wherein the individual one of the federated learning client apparatuses includes a second stop-type fraud detection part that stops processing if the shares of the global update parameter received when the reconstruction is performed do not match.

[Note 9]

The federated learning system according to claim 6; wherein the individual one of the federated learning server apparatuses includes a first nonstop-type fraud detection part that requests the other federated learning server apparatuses to transmit the shares of the local update parameters and adopts, of all the shares of the local update parameters transmitted in response to the request, a majority of shares that match, as accurate shares of the local update parameters.

[Note 10]

The federated learning system according to note 6 or 9; wherein the individual one of the federated learning client apparatuses includes a second nonstop-type fraud detection part that adopts, of all the shares of the global update parameter received when the reconstruction is performed, a majority of shares that match, as accurate shares of the global update parameters.

[Note 11]

A federated learning apparatus, which is one of at least two federated learning apparatuses connected to each other via a network so as to train a shared model, the federated learning apparatus comprising:

a model storage part that replicates and stores the shared model as a local model;

a local training part that trains the local model by using data held by the federated learning apparatus;

a secret sharing part that decomposes a local update parameter indicating a training result of the local model into shares based on an additive secret sharing scheme and distributes the shares to the other federated learning apparatuses;

an aggregation and secure computation part that performs a secure computation for shares of a global update parameter by performing addition of the shares of the local update parameters and multiplication of the shares by cleartext constants; and a global training part that reconstructs the shares of the global update parameter and updates the shared model by the global update parameter.

[Note 12]

A federated learning apparatus, which is one of at least two federated learning apparatuses connected to each other via a network so as to train a shared model, the federated learning apparatus comprising:

a model storage part that replicates and stores the shared model as a local model;

a local training part that trains the local model by using data held by the federated learning apparatus;

a secret sharing part that decomposes a local update parameter indicating a training result of the local model into shares based on an additive secret sharing scheme and distributes the shares to second federated learning apparatuses; and a global training part that reconstructs shares of a global update parameter that the second federated learning apparatuses obtains by performing a secure computation by performing addition of the shares of the local update parameters and multiplication of the shares by cleartext constants, and updates the shared model by the global update parameter.

[Note 13]

A federated learning apparatus, which is one of at least two federated learning apparatuses connected to each other via a network, the federated learning apparatus aggregating local update parameters indicating training results of a local model that are obtained by the other federated learning apparatuses by using data held by the other federated learning apparatuses, the federated learning apparatus comprising:

an aggregation and secure computation part that performs a secure computation for shares of a global update parameter by performing addition of shares obtained by decomposing the local update parameters based on an additive secret sharing scheme and multiplication of the shares by cleartext constants;

wherein the federated learning apparatus transmits the shares of the global update parameter to the other federated learning apparatuses.

[Note 14]

A federated learning method, which is performed coordinately by at least two federated learning apparatuses connected to each other via a network so as to train a shared model, the federated learning method comprising:

causing an individual one of the federated learning apparatuses to replicate and store the shared model as a local model;

causing the individual one of the federated learning apparatuses to train the local model by using data held thereby;

causing the individual one of the federated learning apparatuses to decompose a local update parameter indicating a training result of the local model into shares based on an additive secret sharing scheme and to distribute shares to the other federated learning apparatuses;

causing the individual one of the federated learning apparatuses to perform a secure computation for shares of a global update parameter by performing addition of the shares of the local update parameters and multiplication of the shares by cleartext constants; and causing the individual one of the federated learning apparatuses to reconstruct the shares of the global update parameter and to update the shared model.

[Note 15]

A federated learning program, causing at least two federated learning apparatuses connected to each other via a network to coordinately train a shared model, the federated learning program comprising:

causing an individual one of the federated learning apparatuses to replicate and store the shared model as a local model;

causing the individual one of the federated learning apparatuses to train the local model by using data held thereby;

causing the individual one of the federated learning apparatuses to decompose a local update parameter indicating a training result of the local model into shares based on an additive secret sharing scheme and to distribute shares to the other federated learning apparatuses;

causing the individual one of the federated learning apparatuses to perform a secure computation for shares of a global update parameter by performing addition of the shares of the local update parameters and multiplication of the shares by cleartext constants; and causing the individual one of the federated learning apparatuses to reconstruct the shares of the global update parameter and to update the shared model.

The disclosure of the above PTL is incorporated herein by reference thereto. Modifications and adjustments of the example embodiments or examples are possible within the scope of the overall disclosure (including the claims) of the present invention and based on the basic technical concept of the present invention. Various combinations or selections (including partial deletion) of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed. In addition, as needed and based on the gist of the present invention, partial or entire use of the individual disclosed matters in the above literature that has been referred to in combination with what is disclosed in the present application should be deemed to be included in what is disclosed in the present application, as a part of the disclosure of the present invention.

REFERENCE SIGNS LIST

100, 200, 300, 400, 500, 600 federated learning system
100_i, 200_i, 300_i federated learning apparatus
410_i, 510_i, 610_i federated learning client apparatus
420_i, 520_i, 620_i federated learning server apparatus
101_i, 201_i, 301_i, 401_i, 501_i, 601_i model storage part
102_i, 202_i, 302_i, 402_i, 502_i, 602_i local training part
103_i, 203_i, 303_i, 403_i, 503_i, 603_i secret sharing part 104_*i*, 204_*i*, 304_*i*, 404_*i*, 504_*i*, 604_*i* aggregation and
secure computation part
105_*i*, 205_*i*, 305_*i*, 405_*i*, 505_*i*, 605_*i* global training
part
206_*i*, 506_*i* first stop-type fraud detection part
207_*i*, 507_*i* second stop-type fraud detection part
306_*i*, 606_*i* first nonstop-type fraud detection part
307_*i*, 607_*i* second nonstop-type fraud detection part
10 hardware configuration
11 CPU (Central Processing Unit)
12 main storage device
13 auxiliary storage device
14 IF (Interface) part

What is claimed is:

1. A federated learning system, which includes at least
two federated learning apparatuses connected to each other
via a network so as to train a shared model, an individual one
of the federated learning apparatuses comprising:
    a model storage part that replicates and stores the shared
        model as a local model;
    a local training part that trains the local model by using
        data held by the individual one of the federated learning
        apparatuses;
    a secret sharing part that decomposes a local update
        parameter indicating a training result of the local model
        into shares based on an additive secret sharing scheme
        and distributes the shares to the other federated learning
        apparatuses;
    an aggregation and secure computation part that performs
        a secure computation for shares of a global update
        parameter by performing addition of the shares of the
        local update parameters and multiplication of the shares
        by cleartext constants; and
    a global training part that reconstructs the shares of the
        global update parameter and updates the shared model
        by the global update parameter.

2. The federated learning system according to claim 1,
wherein the individual one of the federated learning appa-
ratuses comprises a first stop-type fraud detection part that
requests the other federated learning apparatuses to transmit
the shares of the local update parameters and stops process-
ing if the shares of the local update parameters transmitted
in response to the request do not match.

3. The federated learning system according to claim 1,
wherein the individual one of the federated learning appa-
ratuses comprises a second stop-type fraud detection part
that stops processing if the shares of the global update
parameter received when the reconstruction is performed do
not match.

4. The federated learning system according to claim 1,
wherein the individual one of the federated learning appa-
ratuses comprises a first nonstop-type fraud detection part
that requests the other federated learning apparatuses to
transmit the shares of the local update parameters and
adopts, of all the shares of the local update parameters
transmitted in response to the request, a majority of shares
that match, as accurate shares of the local update parameters.

5. The federated learning system according to claim 1,
wherein the individual one of the federated learning appa-
ratuses comprises a second nonstop-type fraud detection part
that adopts, of all the shares of the global update parameter
received when the reconstruction is performed, a majority of
shares that match, as accurate shares of the global update
parameters.

6. A federated learning system, comprising federated
learning server apparatuses and federated learning client
apparatuses connected to each other via a network so as to
train a shared model;
    wherein an individual one of the federated learning client
        apparatuses includes:
    a model storage part that replicates and stores the shared
        model as a local model;
    a local training part that trains the local model by using
        data held by the individual one of the federated learning
        client apparatuses;
    a secret sharing part that decomposes a local update
        parameter indicating a training result of the local model
        into shares based on an additive secret sharing scheme
        and transmits the shares to the federated learning server
        apparatuses; and
    a global training part that reconstructs shares of a global
        update parameter received from the federated learning
        server apparatuses and updates the shared model by the
        global update parameter; and
    wherein the individual one of the federated learning
        server apparatuses includes an aggregation and secure
        computation part that performs a secure computation
        for the shares of the global update parameter by per-
        forming addition of the shares of the local update
        parameters and multiplication of the shares by cleartext
        constants and that transmits the shares of the global
        update parameter to the federated learning client appa-
        ratuses.

7. The federated learning system according to claim 6,
wherein the individual one of the federated learning server
apparatuses includes a first stop-type fraud detection part
that requests the other federated learning server apparatuses
to transmit the shares of the local update parameters and
stops processing if the local update parameters transmitted
in response to the request do not match.

8. The federated learning system according to claim 6,
wherein the individual one of the federated learning client
apparatuses includes a second stop-type fraud detection part
that stops processing if the shares of the global update
parameter received when the reconstruction is performed do
not match.

9. The federated learning system according to claim 6,
wherein the individual one of the federated learning server
apparatuses includes a first nonstop-type fraud detection part
that requests the other federated learning server apparatuses
to transmit the shares of the local update parameters and
adopts, of all the shares of the local update parameters
transmitted in response to the request, a majority of shares
that match, as accurate shares of the local update parameters.

10. The federated learning system according to claim 6,
wherein the individual one of the federated learning client
apparatuses includes a second nonstop-type fraud detection
part that adopts, of all the shares of the global update
parameter received when the reconstruction is performed, a
majority of shares that match, as accurate shares of the
global update parameters.

11. A federated learning apparatus, which is one of at least
two federated learning apparatuses connected to each other
via a network so as to train a shared model, the federated
learning apparatus comprising:
    a model storage part that replicates and stores the shared
        model as a local model;
    a local training part that trains the local model by using
        data held by the federated learning apparatus;
    a secret sharing part that decomposes a local update
        parameter indicating a training result of the local model into shares based on an additive secret sharing scheme and distributes the shares to the other federated learning apparatuses;

an aggregation and secure computation part that performs a secure computation for shares of a global update parameter by performing addition of the shares of the local update parameters and multiplication of the shares by cleartext constants; and a global training part that reconstructs the shares of the global update parameter and updates the shared model by the global update parameter.

12. The federated learning apparatus according to claim 11, comprising a first stop-type fraud detection part that requests the other federated learning apparatuses to transmit the shares of the local update parameters and stops processing if the shares of the local update parameters transmitted in response to the request do not match.

13. The federated learning apparatus according to claim 11, comprising a second stop-type fraud detection part that stops processing if the shares of the global update parameter received when the reconstruction is performed do not match.

14. The federated learning apparatus according to claim 11, comprising a first nonstop-type fraud detection part that requests the other federated learning apparatuses to transmit the shares of the local update parameters and adopts, of all the shares of the local update parameters transmitted in response to the request, a majority of shares that match, as accurate shares of the local update parameters.

15. The federated learning apparatus according to claim 11, comprising a second nonstop-type fraud detection part that adopts, of all the shares of the global update parameter received when the reconstruction is performed, a majority of shares that match, as accurate shares of the global update parameters.

16. A federated learning method, which is performed coordinately by at least two federated learning apparatuses connected to each other via a network so as to train a shared model, the federated learning method comprising:

causing an individual one of the federated learning apparatuses to replicate and store the shared model as a local model;

causing the individual one of the federated learning apparatuses to train the local model by using data held by the individual one of the federated learning apparatuses;

causing the individual one of the federated learning apparatuses to decompose a local update parameter indicating a training result of the local model into shares based on an additive secret sharing scheme and to distribute shares to the other federated learning apparatuses;

causing the individual one of the federated learning apparatuses to perform a secure computation for shares of a global update parameter by performing addition of the shares of the local update parameters and multiplication of the shares by cleartext constants; and causing the individual one of the federated learning apparatuses to reconstruct the shares of the global update parameter and to update the shared model by the global update parameter.

17. The federated learning method according to claim 16, comprising causing the individual one of the federated learning apparatuses to stop processing if the shares of the global update parameter received when the reconstruction is performed do not match.

18. The federated learning method according to claim 16, comprising causing the individual one of the federated learning apparatuses to request the other federated learning apparatuses to transmit the shares of the local update parameters and to adopt, of all the shares of the local update parameters transmitted in response to the request, a majority of shares that match, as accurate shares of the local update parameters.

19. The federated learning method according to claim 16, comprising causing the individual one of the federated learning apparatuses to adopt, of all the shares of the global update parameter received when the reconstruction is performed, a majority of shares that match, as accurate shares of the global update parameters.

20. The federated learning method according to claim 16, comprising causing the individual one of the federated learning apparatuses to request the other federated learning apparatuses to transmit the shares of the local update parameters and to stop processing if the shares of the local update parameters transmitted in response to the request do not match.

* * * * *